US012220803B2

(12) United States Patent
Allgaier et al.

(10) Patent No.: US 12,220,803 B2
(45) Date of Patent: Feb. 11, 2025

(54) ATTACHMENT FOR A HAND-HELD POWER TOOL

(71) Applicant: Festool GmbH, Wendlingen (DE)

(72) Inventors: Benjamin Allgaier, Römerstein (DE); Peter Seiler, Dornstadt (DE); Alexander Lautenschläger, Esslingen (DE)

(73) Assignee: FESTOOL GMBH, Wendlingen (DE)

( * ) Notice: Subject to any disclaimer, the term of this patent is extended or adjusted under 35 U.S.C. 154(b) by 478 days.

(21) Appl. No.: 17/606,910

(22) PCT Filed: Apr. 28, 2020

(86) PCT No.: PCT/EP2020/061704
§ 371 (c)(1),
(2) Date: Oct. 27, 2021

(87) PCT Pub. No.: WO2020/221722
PCT Pub. Date: Nov. 5, 2020

(65) Prior Publication Data
US 2022/0314415 A1    Oct. 6, 2022

(30) Foreign Application Priority Data

May 2, 2019  (DE) ...................... 10 2019 111 349.0
May 2, 2019  (DE) ...................... 10 2019 111 351.2

(51) Int. Cl.
*E21B 7/02*     (2006.01)
*B25F 3/00*     (2006.01)
(Continued)

(52) U.S. Cl.
CPC ............... *B25F 3/00* (2013.01); *B25F 5/026* (2013.01); *B25H 1/0078* (2013.01); *B23Q 11/0046* (2013.01); *B23Q 11/0071* (2013.01)

(58) Field of Classification Search
CPC .......... B25F 3/00; B25F 5/026; B25H 1/0078; B23Q 11/0046; B23Q 11/0071
See application file for complete search history.

(56) References Cited

U.S. PATENT DOCUMENTS 7,793,572 B2 *   9/2010  Hirt ........................... B25F 3/00
                                                                 81/473
8,327,551 B2 *  12/2012  Wasielewski ............. B25F 5/02
                                                                 30/500
(Continued)

FOREIGN PATENT DOCUMENTS

CN        101553344 A     10/2009
CN        103042508 A      4/2013
(Continued)

OTHER PUBLICATIONS

Chinese Office Action of Apr. 14, 2023.

*Primary Examiner* — Thomas M Wittenschlaeger
*Assistant Examiner* — David G Shutty
(74) *Attorney, Agent, or Firm* — Hoffmann & Baron, LLP

(57) ABSTRACT

An attachment for a hand-held power tool, wherein the attachment has an attachment housing and a drive element on a drive side, which drive element can be coupled to a machine output element of the hand-held power tool in order to drive the attachment and is firmly connected to an output element of the attachment or is motion-coupled via a gear to drive a working tool, wherein the attachment has a fastening device on the drive side for detachable fastening to the hand-held power tool, wherein the fastening device has at least one support surface that is stationary with respect to the attachment housing for providing support on the hand-held power tool in the direction of a support axis and at least one locking body adjustable between a locking position and an unlocking position and loaded into the locking position by a spring assembly.

30 Claims, 9 Drawing Sheets

(51) Int. Cl.
*B25F 5/02* (2006.01)
*B25H 1/00* (2006.01)
*B66F 11/04* (2006.01)
*E21B 7/04* (2006.01)
*B23Q 11/00* (2006.01)

(56) References Cited

U.S. PATENT DOCUMENTS

| | | | | |
|---|---|---|---|---|
| 9,149,872 | B2 * | 10/2015 | Saur | B23B 31/0261 |
| 9,573,335 | B2 * | 2/2017 | Schweizer | B23B 31/1071 |
| 9,579,784 | B2 * | 2/2017 | Lu | B25F 5/00 |
| 9,694,428 | B2 * | 7/2017 | Tussing | B25F 3/00 |
| 9,751,176 | B2 * | 9/2017 | McRoberts | B25F 5/02 |
| 9,849,576 | B2 * | 12/2017 | Tussing | B23B 31/026 |
| 10,259,111 | B2 * | 4/2019 | Herr | B25F 3/00 |
| 10,478,930 | B2 * | 11/2019 | Saur | B23Q 5/045 |
| 11,034,002 | B2 * | 6/2021 | Gordon | B23B 45/003 |
| 11,504,830 | B2 * | 11/2022 | Gordon | B25B 23/0028 |
| 2001/0026051 | A1 * | 10/2001 | Gifford | B25B 21/007 |
| | | | | 279/19.6 |
| 2003/0066667 | A1 * | 4/2003 | Zhang | B25F 3/00 |
| | | | | 173/217 |
| 2010/0108338 | A1 * | 5/2010 | Hirt | B25F 3/00 |
| | | | | 279/143 |
| 2013/0093142 | A1 | 4/2013 | Saur et al. | |
| 2014/0133898 | A1 | 5/2014 | Tussing | |
| 2014/0346744 | A1 * | 11/2014 | Herr | B25D 17/00 |
| | | | | 279/144 |
| 2015/0115554 | A1 | 4/2015 | Tussing | |
| 2015/0174752 | A1 * | 6/2015 | Lu | F16D 1/116 |
| | | | | 279/9.1 |
| 2023/0045384 | A1 * | 2/2023 | Gordon | B25F 3/00 |

FOREIGN PATENT DOCUMENTS

| | | |
|---|---|---|
| CN | 103817660 A | 5/2014 |
| CN | 103831799 A | 6/2014 |
| CN | 204935583 U | 1/2016 |
| CN | 107980019 A | 5/2018 |
| DE | 20301042 | 3/2003 |
| DE | 20301042 U1 | 3/2003 |
| DE | 202006009078 | 10/2007 |
| DE | 202006009078 U1 | 10/2007 |
| DE | 202007010514 | 10/2007 |
| DE | 202007010514 U1 | 10/2007 |
| DE | 102007006329 | 6/2008 |
| DE | 102007006329 A1 | 6/2008 |
| DE | 102013213806 | 5/2014 |
| DE | 102013213806 A1 | 5/2014 |
| DE | 102015206622 | 10/2016 |
| DE | 102015206622 A1 | 10/2016 |
| DE | 102018102855 | 2/2019 |
| DE | 102018102855 A1 | 2/2019 |
| EP | 2383076 | 11/2011 |
| EP | 2383076 A2 | 11/2011 |
| EP | 3241653 | 11/2017 |
| EP | 3241653 A1 | 11/2017 |

* cited by examiner

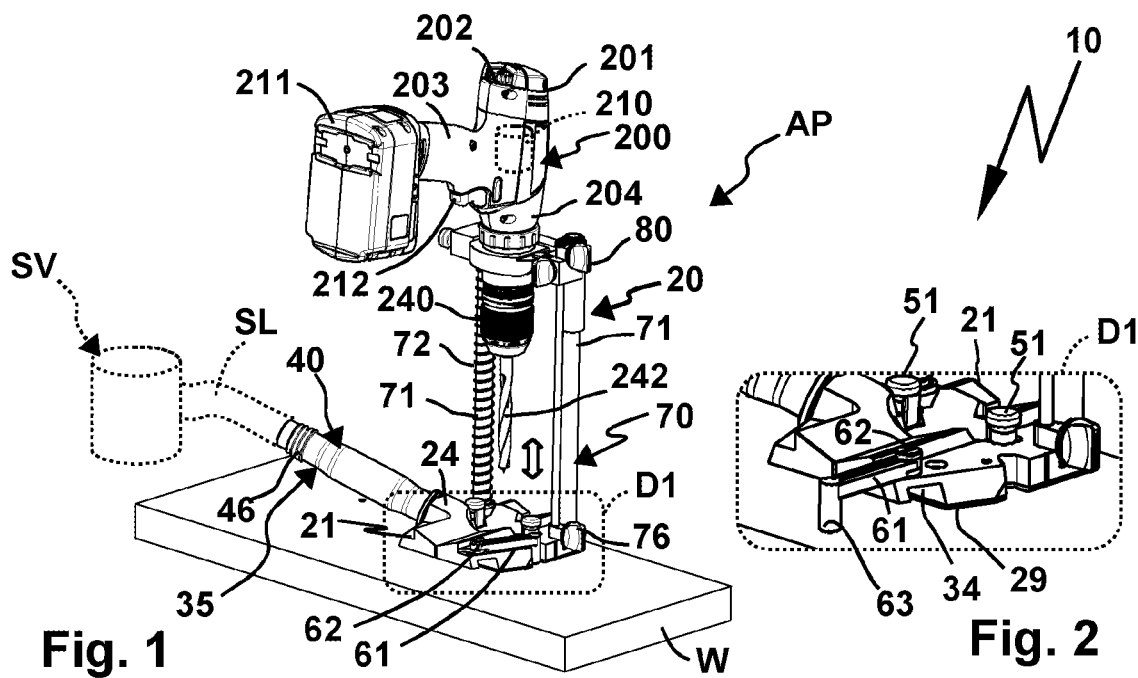
Fig. 1
Fig. 2
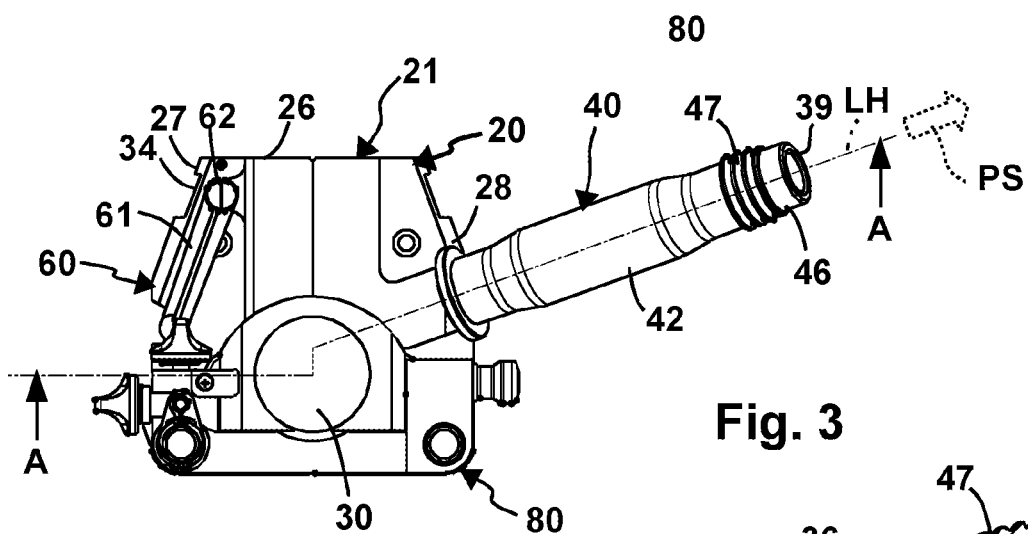
Fig. 3
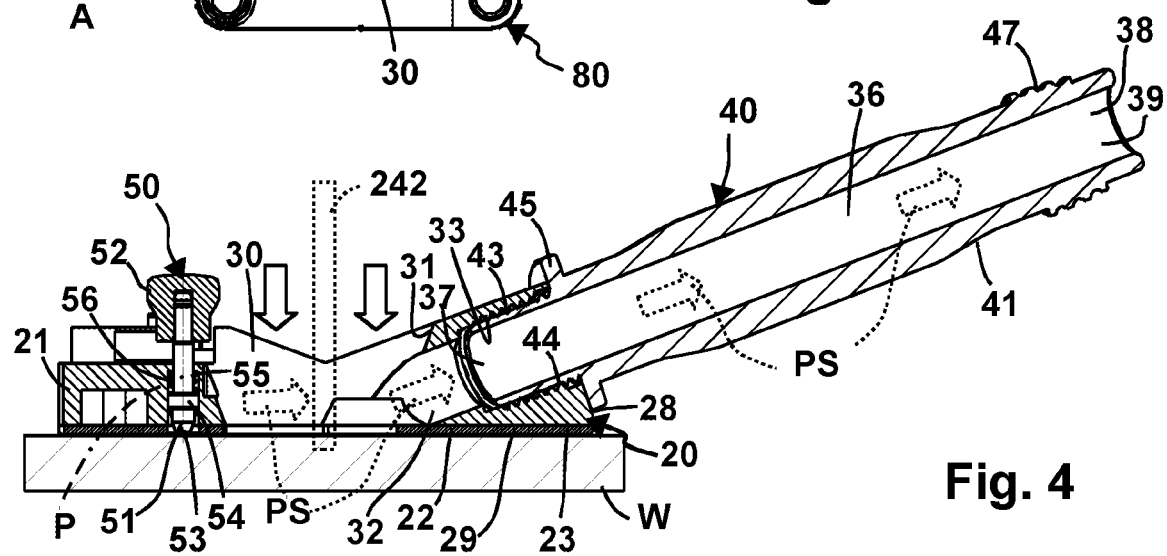
Fig. 4

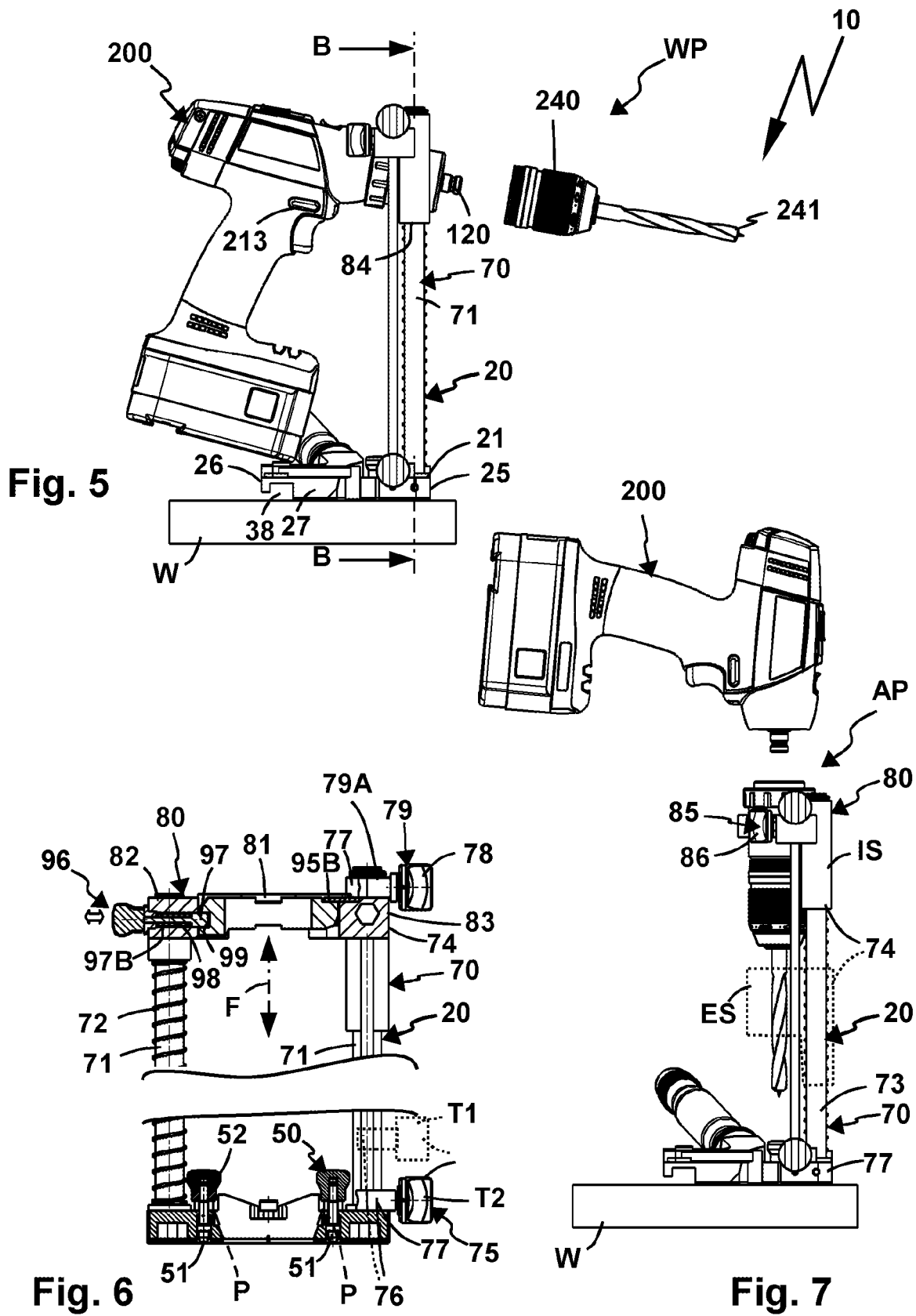

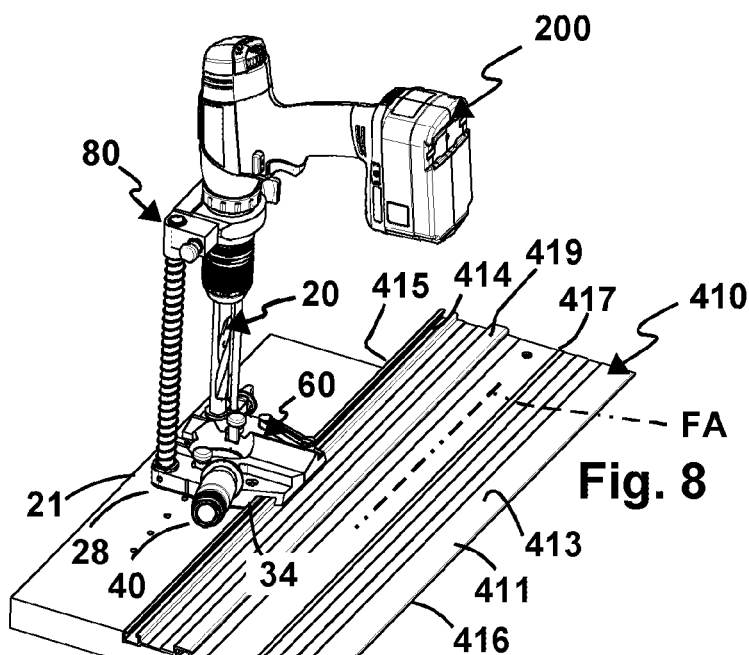
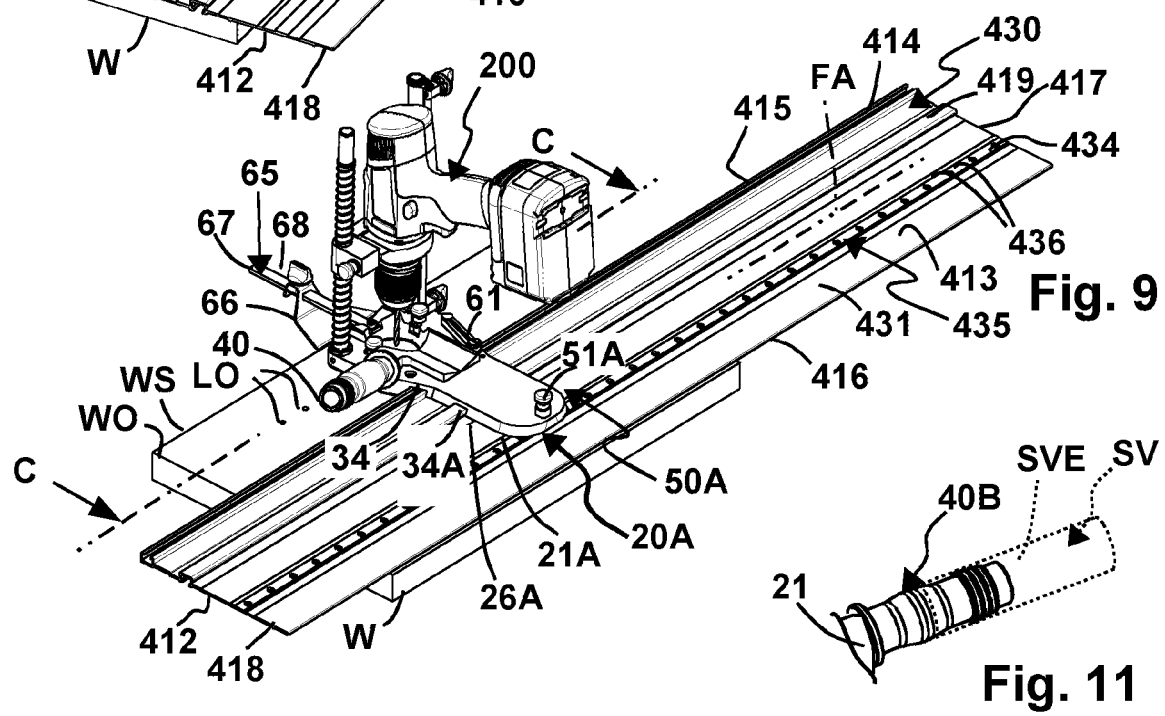
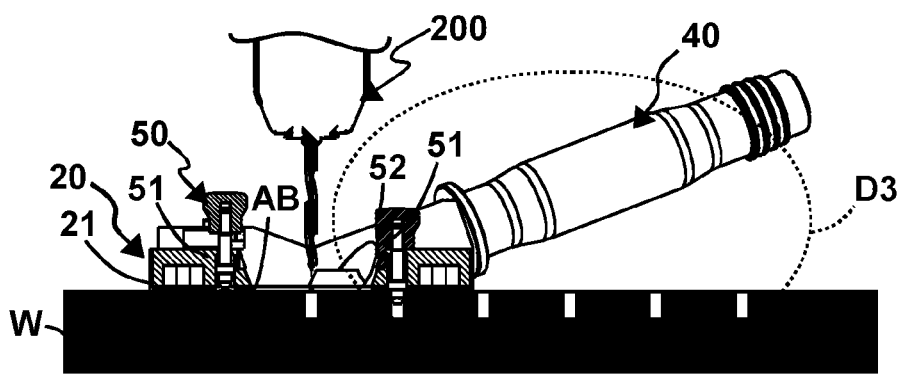

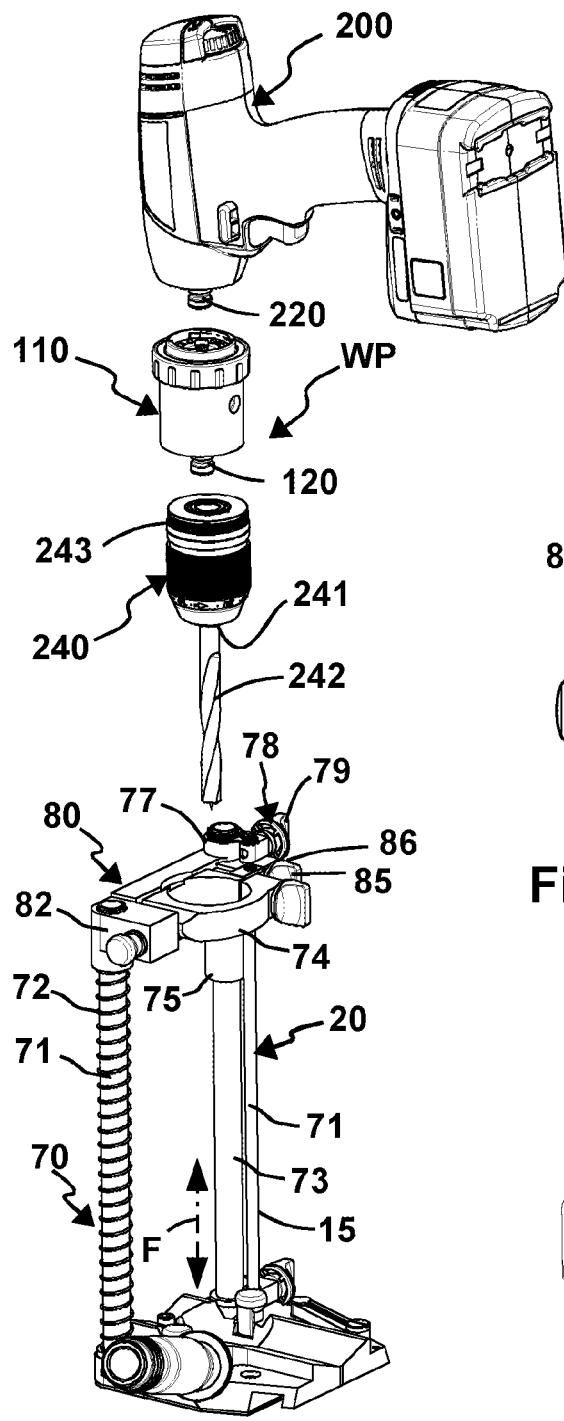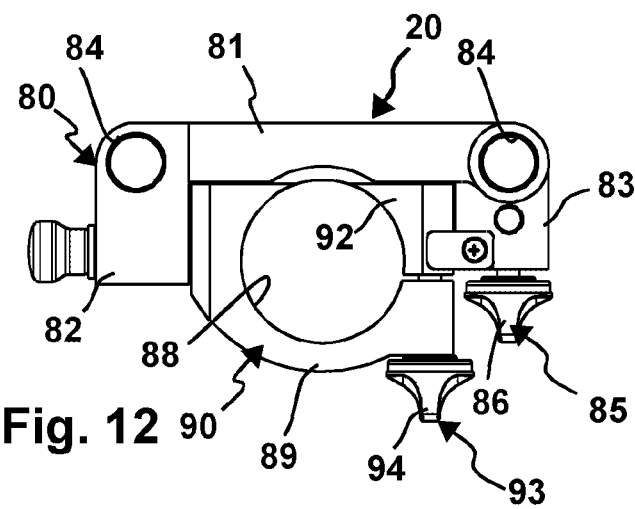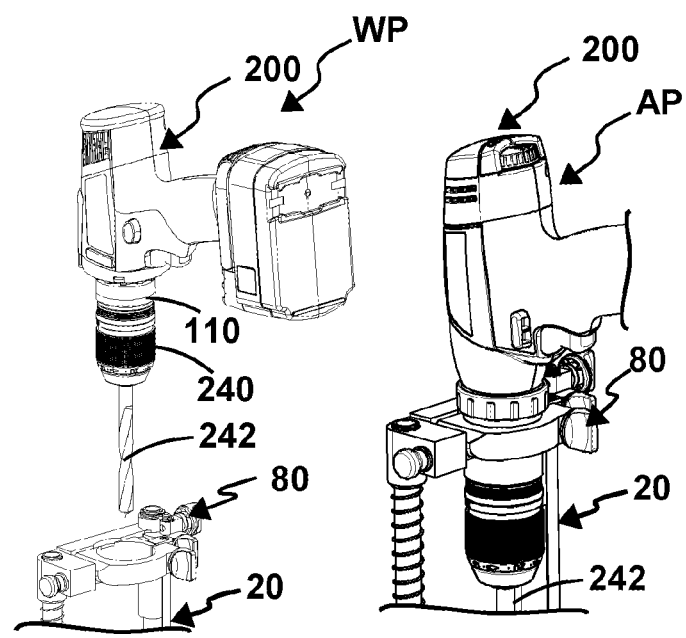
Fig. 12
Fig. 13
Fig. 14
Fig. 15

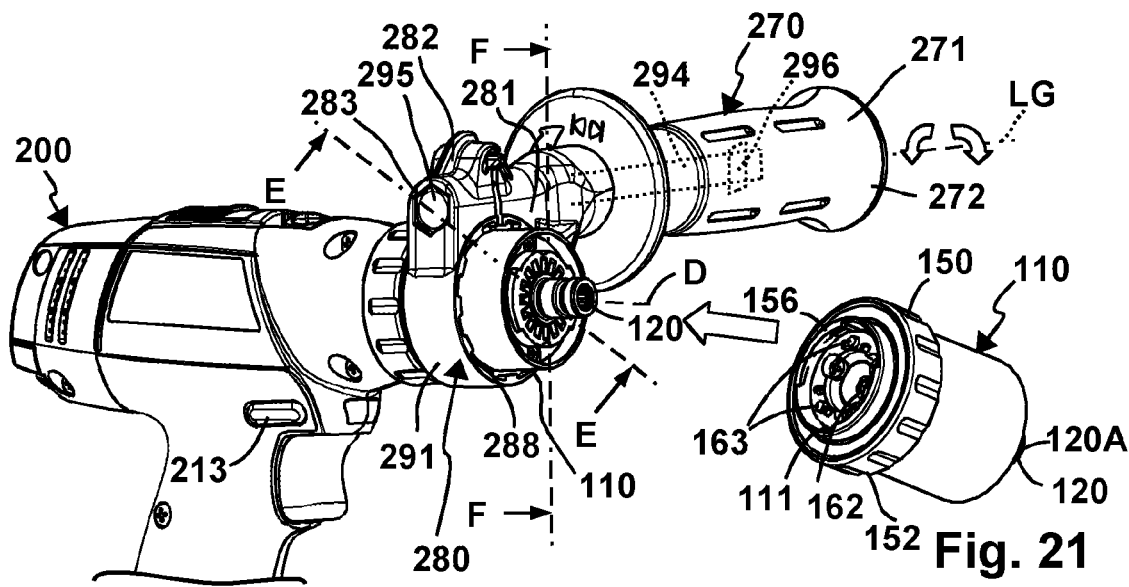
Fig. 21
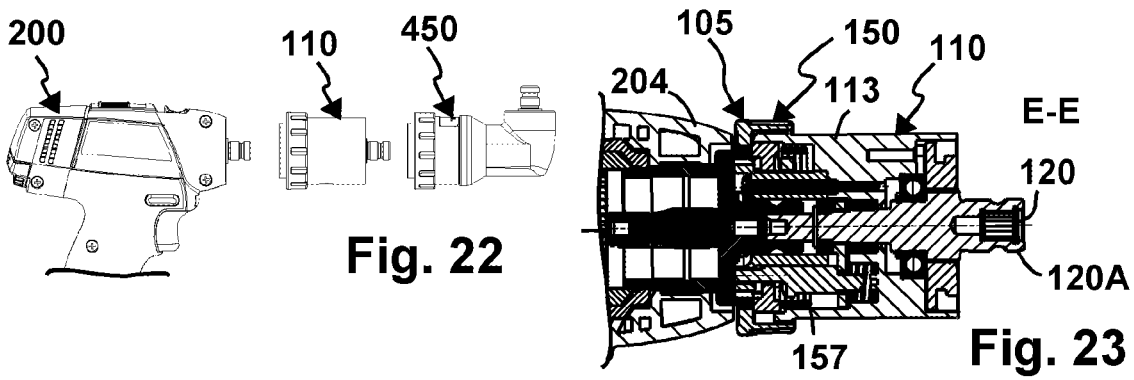
Fig. 22
Fig. 23
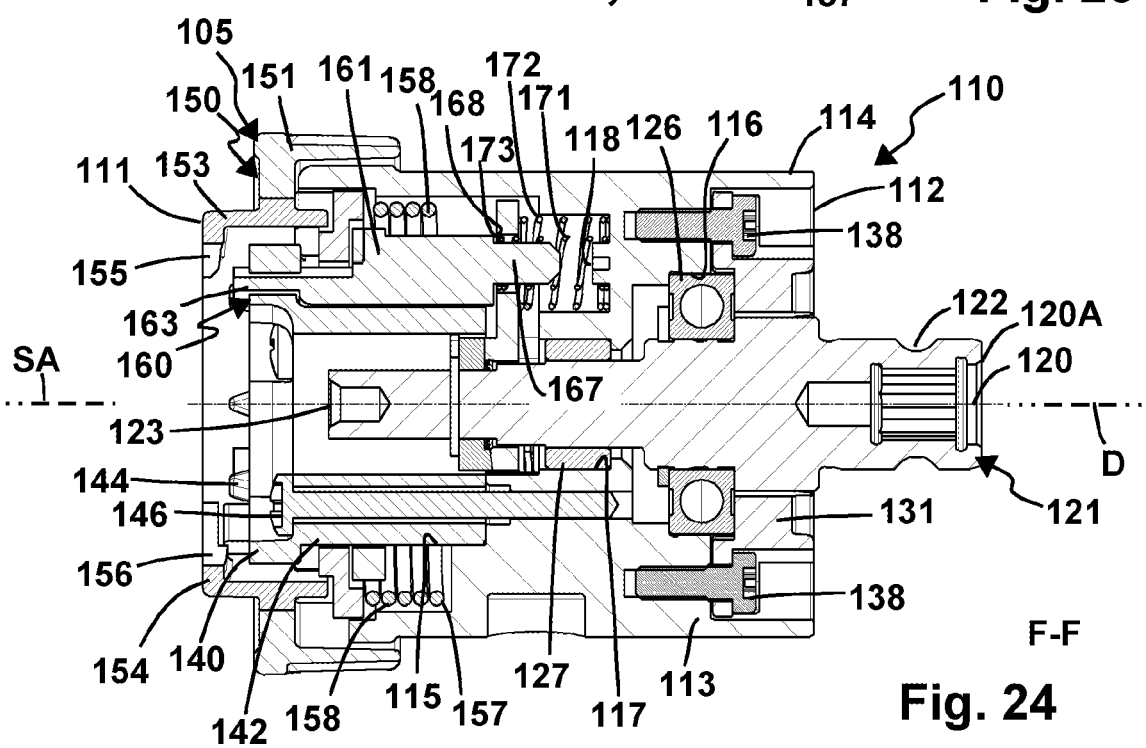
Fig. 24

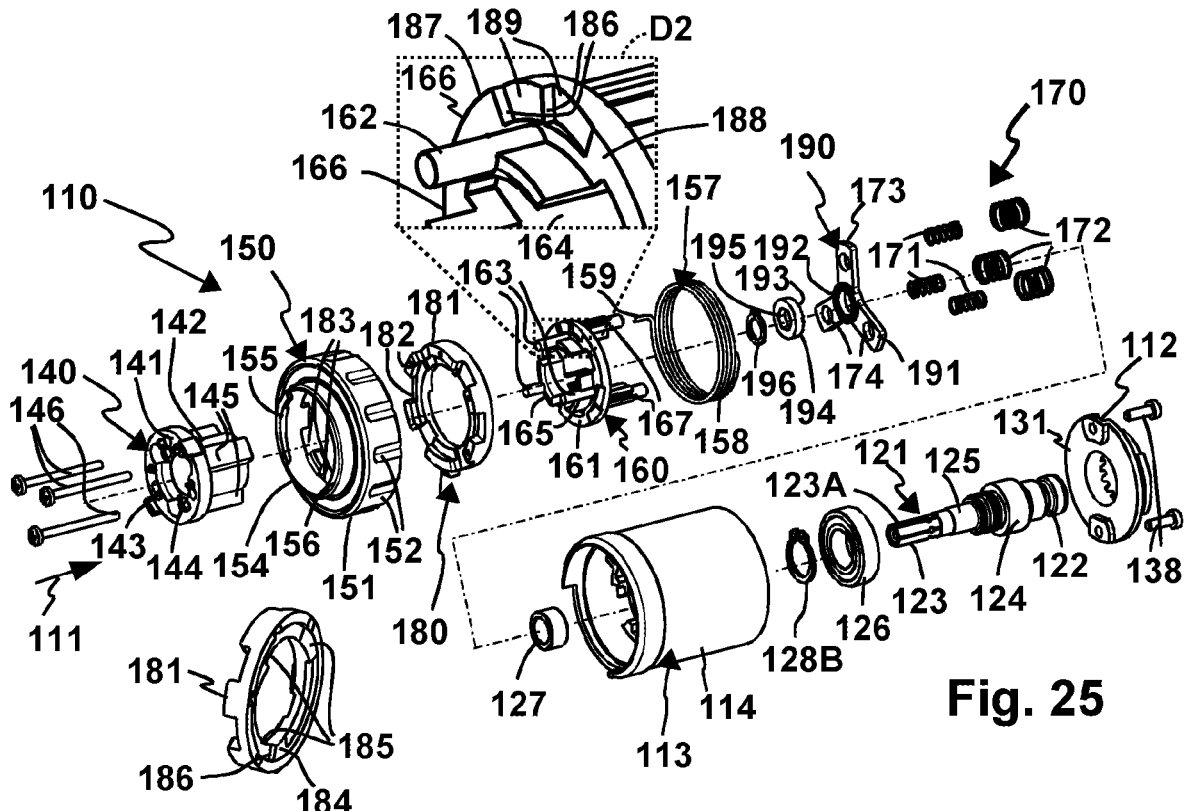
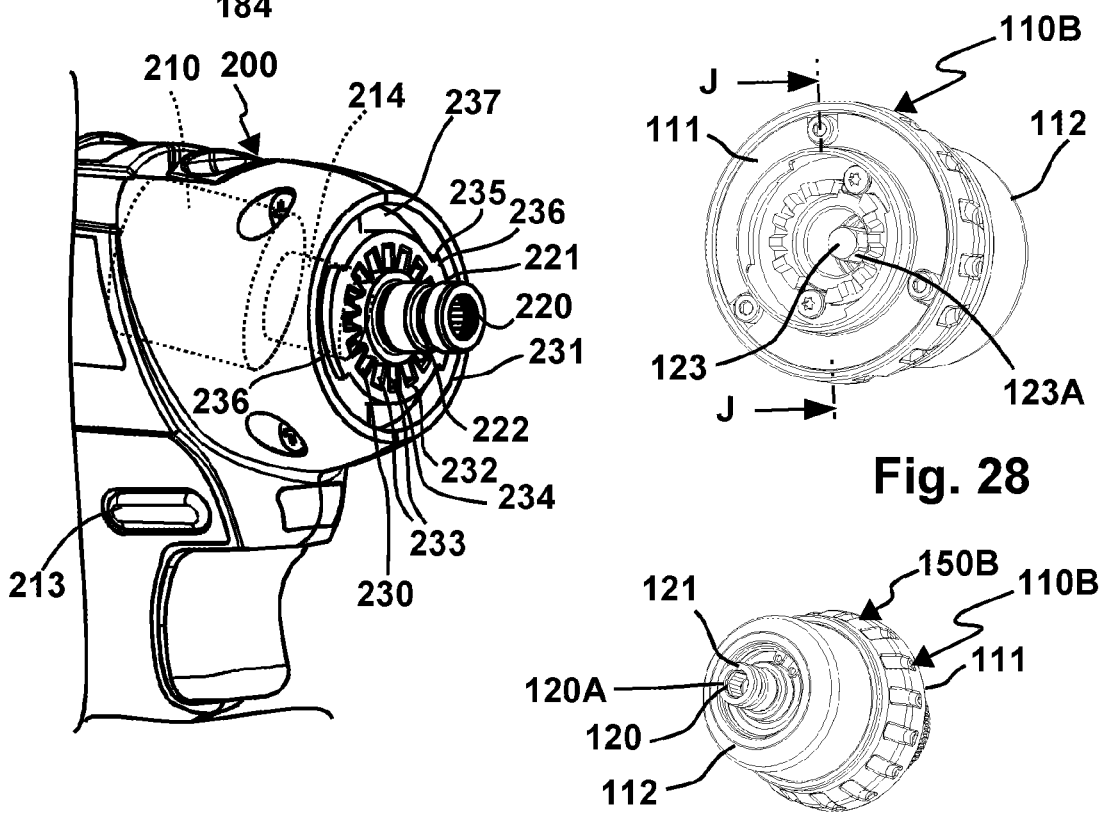

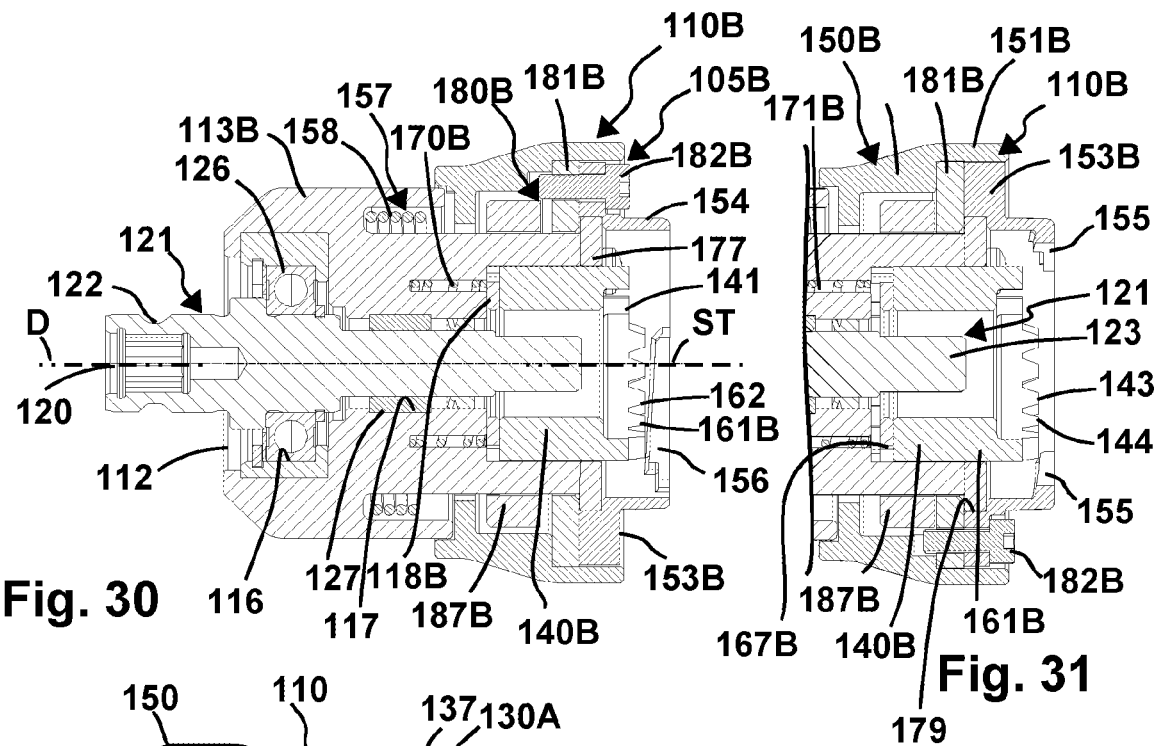
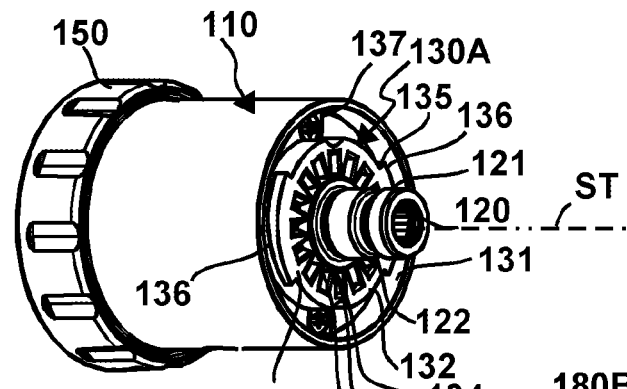
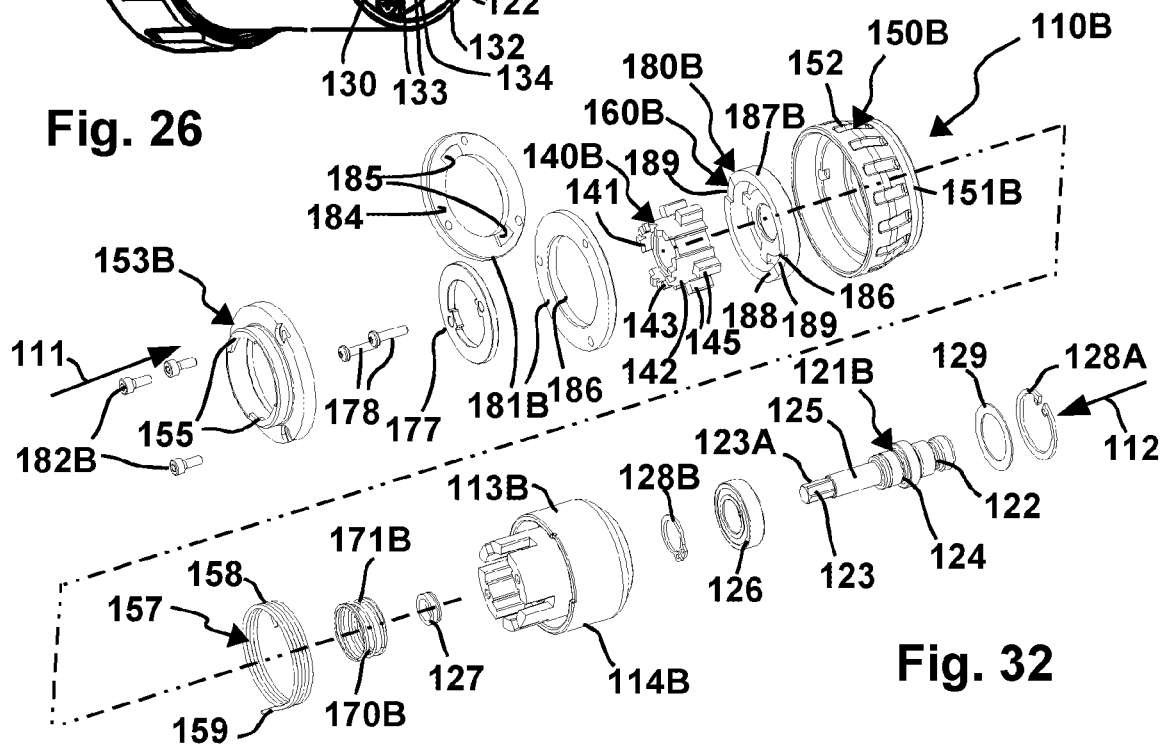

ATTACHMENT FOR A HAND-HELD POWER TOOL

This application is a National Stage application based on International Application No. PCT/EP2020/061704, filed Apr. 28, 2020, which claims priority to DE 102019111351.2, filed May 2, 2019, and DE 102019111349.0, filed May 2, 2019.

BACKGROUND OF THE INVENTION

The invention relates to an attachment for a hand-held power tool, in particular a screwdriver or drill, in which the attachment has an attachment housing and a drive element on a drive side, which drive element can be coupled to a machine output element of the hand-held power tool in order to drive the attachment and is firmly connected to an output element of the attachment or is motion-coupled via a gear in order to drive a working tool, in which the attachment has a fastening device on the drive side for detachable fastening to the hand-held power tool, in which the fastening device has at least one support surface that is stationary with respect to the attachment housing for providing support on the hand-held power tool in the direction of a support axis and at least one locking body adjustable between a locking position and an unlocking position and loaded into the locking position by a spring assembly, which locking body has at least one locking contour which, in the locking position, is in engagement with a counter-locking contour of the hand-held power tool when the at least one support surface is supported on the hand-held power tool, and, in the unlocking position, is out of engagement with the counter-locking contour in order to remove the attachment from the hand-held power tool.

Such an attachment is explained, for example, in EP 2 383 076 A2. An end face of the attachment housing forms a support surface on which anti-rotation contours are also arranged. The drive element is arranged in the interior space of the attachment housing and arranged thereon, in turn, is a locking body, for example a ball, which is movable radially as relates to the axis of rotation of the drive element. When the attachment is plugged into the hand-held power tool, for example a screwdriver, the locking body, which is loaded radially inward as relates to the axis of rotation of the drive element, engages with a retaining mount on the machine output element of the hand-held power tool, so that the attachment is held on the hand-held power tool with tensile strength.

However, the locking takes place on a rotating component, namely the machine output element of the hand-held power tool. To release the lock, an operator reaches into an interior space of the attachment, which is inconvenient in some cases.

SUMMARY OF THE INVENTION

It is therefore the object of the present invention to provide an improved attachment.

To achieve the object, it is provided that the locking body is rotatably mounted about the support axis for adjustment between the locking position and the unlocking position.

Thus, the at least one locking contour can be brought into engagement with or disengaged from the counter-locking contour by a tangential pivoting movement or rotary movement of the locking body. As a result of the tangential or pivoting movement of the locking contour, for example, a high tightening torque can be achieved, that is to say that the locking can be optimally implemented with respect to the support axis. For example, the spring forces of the spring assembly, which loads the locking element in the direction of the locking position, can be small.

For example, the support axis is coaxial or parallel to an axis of rotation of the drive element.

The support axes and/or an axis of rotation of the drive element coaxial is preferred having a longitudinal center axis of the attachment or a longitudinal center axis of a part of the attachment which has the drive side.

A tool mount for the working tool is advantageously arranged on the output element so that the drive motor of the hand-held power tool can drive the working tool via the attachment. It is also possible, however, for a holder for a tool chuck to be arranged on the output side on which the output element is arranged, to which, in turn, the working tool can be fastened.

In principle, it would be possible for the locking contour to be provided for engagement with a counter-locking contour of the hand-held power tool which is arranged on its machine output element. In such an embodiment, the locking contour and the counter-locking contour rotate when the machine output element is driven. However, the following embodiment is preferred: The locking contour is advantageously provided and/or designed for engagement with a counter-locking contour of the hand-held power tool, which is stationary with respect to a machine housing of the hand-held power tool.

Advantageously, the locking body and the drive element are rotatably mounted independently of one another and/or rotationally decoupled from each other with respect to the attachment housing or on the attachment housing. Both measures make it possible for the drive element to be rotatable when the locking body is stationary on the attachment housing and/or the locking body is rotatable when the drive element is stationary on the attachment housing.

It is advantageously provided that the at least one locking contour is or comprises a bayonet contour and/or has an arc shape. The at least one locking contour preferably extends in a ring around the support axis of the attachment. It is also advantageous if the at least one locking contour comprises one or more locking cams.

It is preferred if the at least one locking contour has at least one clamping contour, in particular a clamping slope or a clamping ramp, for clamping the attachment to the hand-held power tool. An increase in the clamping slope or clamping ramp coincides with an inclination to an axis orthogonal to the support axis. The inclination is preferably a flat inclination at an angle of, for example, about 1-5° with respect to this orthogonal axis. The inclination with respect to the support axis is preferably about 91-95°.

It is preferred if the at least one locking contour comprises at least two locking contours arranged at an angular distance on the locking body.

It is advantageous if the locking body has at least one gripping contour that can be grasped by an operator. The gripping contour is, for example, knurling, protruding ribs, or the like.

It is advantageous if the locking body cannot be actuated from the locking position in the direction of the unlocking position when the attachment is arranged on the hand-held power tool. Thus, the locking body cannot move in the direction of the unlocking position by itself when the attachment is mounted on the hand-held power tool.

Furthermore, it is advantageous if, on a side of the locking body facing the hand-held power tool, there is no actuating surface or actuating bevel arranged, on the basis of which a contour of the hand-held power tool can actuate the locking body from the locking position in the direction of the unlocking position. The contour is, for example, a housing contour or housing surface of the machine housing of the hand-held power tool.

The locking body is preferably designed as an annular body that extends in a partially ring-shaped or ring-shaped manner around the support axis. For example, the locking body is arranged on the drive side or the drive-side end face of the attachment housing. The locking body extends in an annular or partially annular manner there.

It is preferred if the spring assembly comprises a torsion spring through which the support axis of the attachment passes and which is supported, on the one hand, on the attachment housing and, on the other hand, on the locking body. Further components of the attachment, for example a shaft element, further springs, or the like, can be arranged in the interior of the torsion spring.

For example, it is advantageous if the drive element is arranged in an interior space of the spring assembly and/or of the locking body, in which the locking body is, for example, ring-shaped or partially ring-shaped. The drive element is thus arranged radially on the inside with respect to the spring assembly. The spring assembly extends in a radial outer circumference around an axis of rotation of the drive element.

To prevent the attachment from rotating or to hold the attachment on the hand-held power tool, it is advantageous if the attachment has at least one anti-rotation contour for supporting the attachment on the hand-held power tool in a rotationally fixed manner with respect to the support axis, which anti-rotation contour is in engagement with a counter-anti-rotation contour of the hand-held power tool when the attachment is mounted on the hand-held power tool.

The at least one anti-rotation contour is advantageously arranged in an interior space of the locking body. For example, the locking body extends around an axis, for example the axis of rotation of the drive element. The locking body extends, for example, around the anti-rotation contour. The anti-rotation contour is advantageously arranged between the drive element and the locking body.

It is advantageously provided that the at least one anti-rotation contour is stationary with respect to the attachment housing or is mounted displaceably in the direction of the support axis.

In the case of the displaceable anti-rotation contour, it is advantageous if the attachment has at least one support stop for the at least one anti-rotation contour, with which support stop a body, for example a sleeve body or sleeve-like support body, of the attachment, which body has the anti-rotation contour, makes contact when the at least one anti-rotation contour engages with the counter-anti-rotation contour of the hand-held power tool. The support stop forms, for example, a longitudinal stop or an end stop. The support stop limits, for example, a displacement path of the body supporting the anti-rotation contour in a direction away from the hand-held power tool.

It is also advantageous if the at least one anti-rotation contour is loaded, by a spring assembly, in the direction of an engagement position provided for engaging the counter-anti-rotation contour of the hand-held power tool. The spring assembly thus ensures that the anti-rotation contour remains in engagement with the counter-anti-rotation contour. For example, a body supporting the at least one anti-rotation contour, in particular a sleeve body or sleeve-like support body, is spring-loaded by the spring assembly in the direction of the counter-anti-rotation contour of the hand-held power tool or in a direction in front of the drive side. At the same time, this body can form a blocking body of an actuating device or can be motion-coupled, in particular firmly connected, to such a blocking body, which will be explained below.

It is advantageous if the at least one anti-rotation contour, in particular designed as toothing and protruding in front of an end face of the attachment in the direction of the support axis, has form-fit projections for engagement with form-fit mounts of the hand-held power tool.

It is also advantageous if the at least one anti-rotation contour extends in an arc-shaped or star-shaped manner around the support axis. For example, several anti-rotation contours can extend in a star shape or radially away from the support axis and have an arcing or angular distance from one another.

A preferred design provides that the at least one anti-rotation contour is arranged on a sleeve body or sleeve-like support body. For example, an end face or narrow side of the sleeve body or support body has the anti-rotation contours, in particular a tooth or toothing. The sleeve body or support body is preferably penetrated by the support axis, or the support axis is coaxial with a longitudinal center axis of the sleeve body or support body.

An advantageous design provides that the attachment has an actuating device for triggering a movement of the locking body from the unlocking position into the locking position, in which the actuating device has a blocking body which holds the locking body in a blocking position against the force of the spring assembly in the unlocking position and which can be brought into a release position, by an operator action, in which the blocking body releases the locking body for movement out of the unlocking position in the direction of the locking position. Thus, the locking body is initially blocked in the unlocking position and pretensioned by the spring assembly and can be triggered by the actuating device so that the locking body automatically locks the attachment on the hand-held power tool, so to speak.

It is advantageous if the blocking body is longitudinally displaceable, in particular parallel to the support axis, and/or is rotatably mounted on the attachment housing or with respect to the attachment housing. It goes without saying that the blocking body can be rotatably and displaceably mounted, for example along an inclined path, with respect to the attachment housing or on same.

It is also preferred if the blocking body is loaded by a spring assembly in the direction of the blocking position. The blocking body is thus loaded in the direction of the unlocking position of the locking body or loaded into a position in which the blocking body holds the locking body in the unlocking position. The blocking body can be adjusted into the release position against the force of the spring assembly, in which case it then releases the locking body from a movement from the unlocking position into the locking position.

It is also advantageous if the blocking body has an actuating contour which can be actuated by the hand-held power tool to actuate the blocking body from the blocking position into the release position. For example, the actuating contour protrudes in front of the drive side of the attachment in the direction of the hand-held power tool, for example in front of its front side, and can be actuated from the blocking position into the release position by the hand-held power tool when the attachment is plugged in or arranged on the hand-held power tool.

It is also advantageous if the at least one anti-rotation contour is arranged on the blocking body and/or is designed to actuate the blocking body from the blocking position into the release position. Thus, the anti-rotation contour is brought into engagement with the counter-anti-rotation contour of the hand-held power tool and, at the same time, the blocking body is moved from the blocking position into the release position.

An actuating gear, in particular a deflecting gear, is advantageously arranged between the locking body and the blocking body, by means of which actuating gear the locking body releases or actuates the blocking body for an adjustment from its release position into its blocking position when it is moved from its locking position to its unlocking position. When the operator unlocks the locking body, for example, the operator simultaneously actuates the actuating device from the release position into the blocking position or enables such an adjustment by means of a spring assembly that loads the blocking body.

One embodiment advantageously provides that the deflecting gear is or comprises a bevel gear. It is advantageous if the deflecting gear deflects or releases a rotary movement of the locking body about the support axis into a linear movement of the blocking body parallel to the support axis. For example, the locking body is rotated for adjustment from the locking position into the unlocking position and releases the blocking body so that the blocking body can return to its blocking position while spring-loaded from its actuation process.

It is also advantageous if the deflecting gear has inclined surfaces or actuating bevels for engagement with one another. The inclined surfaces or actuating bevels can be arranged directly on the respective locking body or blocking body or also on a body which is respectively motion-coupled or firmly connected to the locking body or blocking body.

In one embodiment, the attachment can be passive, so to speak, between its drive and its output. For example, it is possible that no torque-converting or speed-changing component is arranged between the drive element and the output element. In particular, the drive element and the output element are combined in one piece and/or firmly connected to one another.

However, it is also possible that the gear is or comprises a speed-changing gear, for example a planetary gear. For example, the gear can reduce or increase a speed of the output element compared to a speed of the drive element. For example, an angular gear is provided between the drive element and the output element. The angular gear can be provided in combination with the speed-changing gear or cause no speed change.

It is also possible that the axes of the drive element and the output element are not coaxial in the attachment. For example, it is possible for the axes of rotation of the drive element and of the output element to be at an angle with respect to one another or to be spaced apart from one another in parallel. The attachment is, for example, a so-called angle attachment or an eccentric attachment.

On an output side of the attachment, which output side has the output element, fastening means are expediently arranged which are compatible with the fastening device and comprise a support body for supporting the support surface of the fastening device and a counter-locking contour for engaging the at least one locking contour of the fastening device. It is of course advantageous if counter-anti-rotation contours are additionally provided on the support body of the fastening means. For example, a row arrangement with two attachments according to the invention can be produced, one of the attachments being arranged between the other attachment and the hand-held power tool. Furthermore, it is possible for the attachment according to the invention to be arranged, for example, like a sandwich between the hand-held power tool and an attachment not according to the invention, which can be fastened directly to the hand-held power tool.

The attachment has an anti-rotation device for the drive element, which anti-rotation device is motion-coupled to the locking body and which assumes an anti-rotation position in the unlocking position of the locking body and positions the drive element in a rotationally fixed manner and assumes a rotation-release position in the locking position of the locking body and releases the drive element to enable it to rotate. The anti-rotation device has, for example, an anti-rotation body which is adjustable parallel to the support axis and engages with form-fit contours on the drive element in the anti-rotation position and does not engage with the form-fit contours of the drive element in the rotation-release position. The anti-rotation body is preferably linearly motion-coupled to the blocking body of the actuating device.

Finally, the invention advantageously also relates to a system which has a guide device and an attachment according to the invention that can be detachably mounted on the guide device and/or relates to a hand-held power tool that can be detachably mounted on the guide device, in particular a hand-held power tool that can be detachably mounted on the guide device using the attachment.

The guide device has, for example, a mounting bracket for releasably holding a hand-held power tool, in particular a hand-held drill, and a contact body which has a contact surface for contact with a workpiece to be machined with the hand-held power tool, the hand-held power tool having a machine housing and a drive motor arranged in the machine housing for driving a tool mount, on which a working tool, designed in particular as a drilling tool or cutting tool, can be detachably mounted, the guide device having a guide assembly for guided relative adjustment of the tool mount with respect to the contact body.

The guide device advantageously has a dust removal device with a dust removal channel, the first end region of which has an inflow opening in the area of the contact surface for the inflow of a particle stream and the second end region of which has an outflow opening in the area opposite the first end region for the particle stream. It is advantageously provided with the guide device, which in this embodiment can also represent an independent invention and in which the attachment is not necessary, that the dust removal channel extends on a handgrip element that can be grasped by an operator and with which the operator can hold the guide device in a manner to establish contact with the workpiece to be machined. The dust removal channel can penetrate the handgrip element and/or a part of the contact body. Alternatively, it is also possible that the dust removal channel is arranged laterally on the handgrip element, at least in sections, and/or laterally on the contact body or extends there. Thus, on the one hand, the dust removal channel and, on the other hand, the handgrip element or the contact body can be separate components, which, however, are expediently firmly connected to one another. An integrated solution, however, is preferred and favorable in practice such that the dust removal channel extends in the handgrip element and the contact body.

An advantageous design provides that the mounting bracket has at least one holding component that forms part of the guide device and is separate from the guide assembly, with the aid of which the tool mount can be adjusted between a working position intended for machining the workpiece and a tool change position intended for a tool change, in which tool change position the tool mount is adjusted further away from at least one component of the guide device, in particular the contact body, that obstructs or prevents a tool change, and is more accessible for the tool change than in the working position, the hand-held power tool being connected to the holding component in the working position and in the tool change position.

The holding component is provided by the guide device and can remain firmly on the guide device or be removable from the guide device. The holding component enables a convenient tool change in both cases. In the tool change position, the tool mount is no longer located opposite the component obstructing the tool change, for example the contact body, the guide assembly, or the like, but instead is moved away from it. It may be possible, for example with the aid of the guide assembly, to adjust the hand-held power tool and thus its tool mount further away from the contact body. The additional chuck component, however, improves handling considerably.

The tool mount can be provided directly on the hand-held power tool. It is also possible for the hand-held power tool to have a tool chuck which, for example, has a tool holder for the working tool. It is possible for the tool chuck to be arranged on the tool mount for the hand-held power tool.

It is preferred if the tool mount lies opposite the contact body in the working position when the hand-held power tool is being retained on the mounting bracket. In the tool change position however, the tool mount is preferably adjusted to an angular position in which a plug-in axis, along which the working tool can be attached to the tool mount, and/or an axis of rotation of the tool mount does not extend through the contact body. However, the plug-in axis or axis of rotation extends through the contact body in the working position. The drive motor of the hand-held power tool drives the tool mount around the axis of rotation.

It is advantageously provided that an axis of rotation of the tool mount, around which the tool mount can be driven by the drive motor of the hand-held power tool, is parallel to a guide axis of the guide assembly in the working position, with which guide axis the guide assembly guides the tool mount relative to the contact body when the hand-held power tool is being held on the mounting bracket. The guide assembly comprises or is, for example, a linear guide. It is possible that the guide axis and the axis of rotation are also parallel to one another in the tool change position, for example in the case of a linear adjustment of the mounting bracket. However, it is preferred that the guide axis and the axis of rotation have an angular distance apart from one another in the tool change position.

The mounting bracket has, for example, a bearing, for example a pivot bearing, a linear bearing, a sliding bearing, or combinations thereof, for adjusting the tool mount between the working position and the tool changing position. For example, a pivot bearing enables the hand-held power tool to be pivoted from a position in which its tool mount is opposite the contact body into the tool change position in which the contact body is no longer arranged frontally in front of the tool mount. A linear mounting or sliding mounting makes it possible for the tool mount to be shifted further away from the contact body in the tool change position than in the working position.

In the case of the guide device, it is advantageously provided that the mounting bracket has a fixing device for fixing, in particular, a locking device for locking and/or a clamping device for clamping the mounting bracket in the working position and/or the tool change position. The mounting bracket can therefore be fixed and/or locked and/or clamped in the working position or the tool change position or both with the fixing device. It goes without saying that combinations of such fixing means are possible, i.e. for example that the mounting bracket is clamped and locked in the working position, while it is only locked in the tool change position. Furthermore, it is possible that the mounting bracket can be fixed only in the working position or only in the tool change position by the fixing device. A clamping device comprises, for example, a clamping screw that can be screwed between a clamping position and a release position. Such a clamping screw can, for example, be arranged directly on the mounting bracket and act against a base body of the guide device in the sense of clamping. A locking device comprises, for example, one or more locks, for example a linearly displaceable and/or pivotable lock.

The fixing device advantageously has at least one locking body or latching body. The locking body or latching body is advantageously spring-loaded, by means of a spring assembly, in a locking position that locks the mounting bracket. The lock expediently has a handgrip which can be grasped by an operator in order to move the locking body or latching body from the locking position, against the spring force of the spring assembly, into a release position releasing the mounting bracket for adjustment between the working position and the tool change position. The locking body is designed, for example, as a locking pin. The spring or spring assembly is supported, on the one hand, on the locking body for example and, on the other hand, on a component supporting the locking body, for example the mounting bracket or a bearing body on which the mounting bracket is movably mounted.

It is preferably provided with the guide device that the holding component is designed as an attachment, which has an attachment housing and a drive element on a drive side that can be coupled to a machine output element of the hand-held power tool to drive the attachment and is firmly connected or motion-coupled via a gear to drive a working tool with an output element of the attachment, with a fastening device on the drive side for detachable attachment to the hand-held power tool and a tool mount for the working tool being arranged on the output element, so that the drive motor of the hand-held power tool can drive the working tool via the attachment. Thus, the guide device provides an attachment as a holding component, which can remain on the hand-held power tool when it is adjustable between the working position and the tool change position.

The mounting bracket advantageously has a retaining mount, in particular a plug-in mount, for mounting, in particular for inserting, the hand-held power tool and/or an attachment arranged on the tool mount of the hand-held power tool, in particular an attachment according to the above description. One variant provides, for example, that a housing section or some other section of the hand-held power tool can be introduced into the retaining mount, for example pushed through or inserted. However, it is also possible that an attachment, for example an angle attachment or the attachment described above, which forms part of the guide device, is arranged on the hand-held power tool and can be introduced, for example inserted, into the retaining mount.

It is preferred if the mounting bracket has a clamping device for clamping the at least one holding component and/or the hand-held power tool and/or a locking device for locking the at least one holding component and/or the hand-held power tool. The locking device comprises, for example, a lock which, in a release position, does not engage with a locking mount of the holding component or the hand-held power tool, but does engage with the locking mount in its locking position. To form the clamping device, the aforementioned retaining mount can be provided with a clamping screw, with which a cross-section of the retaining mount is smaller in a clamping position of the clamping device than in a release position, so that, in the clamping position, the holding component or the hand-held power tool is clamped in the retaining mount. It is possible that the retaining mount is reduced in size as a whole or that, for example, a clamping element, in particular a clamping screw, reduces the cross-section of the retaining mount in the clamping position or protrudes further into the retaining mount than it does in the release position.

It is advantageous if the mounting bracket comprises or has a clamp or a clamping ring for clamping the attachment. The clamping device can, for example, be adjustable, by means of an actuating element, in particular a clamping screw, between a clamping position that clamps the object to be clamped and a release position that releases it. The actuating element can be designed, for example, as a handgrip that is suitable for being grasped by an operator's hand. The actuating element can also have, for example, a hand knob or a head in the manner of a knob.

The guide device is preferably designed in such a way that the hand-held power tool remains on the guide device during the adjustment between the working position and the tool change position and/or forms an integral part of the guide device. Thus, the hand-held power tool does not have to be removed from the guide device for the tool change. This can be achieved, for example, through the already mentioned pivot bearing of the mounting bracket.

It is possible for the attachment to form a fixed component of the mounting bracket and for the fastening device to be provided for releasably fastening the hand-held power tool to the guide device.

It is also possible for the attachment to form a component of the guide device that can be releasably attached to the mounting bracket.

The guide device advantageously has a dust removal device with a dust removal channel, the first end region of which has an inflow opening in the area of the contact surface for the inflow of a particle stream and the second end region of which has an outflow opening in the area opposite the first end region for the particle stream.

It is advantageously provided that the dust removal channel extends on a handgrip element that can be grasped by an operator and with which the operator can hold the guide device in a manner to establish contact with the workpiece to be machined.

A fundamental concept here is that the dust removal channel extends on a handgrip element that can be grasped by an operator in a manner to establish contact with the workpiece to be machined. The handgrip element protrudes from the guide device in an ergonomically favorable manner.

The dust removal channel can penetrate the handgrip element and/or a part of the contact body. Alternatively, it is also possible that the dust removal channel is arranged laterally on the handgrip element and/or laterally on the contact body, at least in sections, or extends there. Thus, on the one hand, the dust removal channel and, on the other hand, the handgrip element or the contact body can be separate components, which, however, are expediently firmly connected to one another. An integrated solution, however, is preferred and favorable in practice such that the dust removal channel extends in the handgrip element and the contact body.

A suction hose connection for a suction hose is expediently arranged at the outflow opening. For example, the suction hose connection has a plug-in mount or a plug projection for inserting or attaching a suction hose. A rotary decoupling can be provided on the suction hose connection, i.e. the suction hose connection can be rotated relative to a base body of the handgrip element.

The suction hose or, in any case, a part of the suction hose that is firmly or detachably connected to the handgrip element preferably forms a handgrip section provided for grasping by an operator. The suction hose can be connected to the handgrip element in a fixed or detachable manner. For example, a length of this handgrip section is approximately 10-15 cm and/or is designed for grasping with one hand of an operator. The part of the suction hose connected to the handgrip element can be stiffened, for example, by a plug projection of the handgrip element which engages with the suction hose. This part of the suction hose has, for example, greater rigidity than a part of the suction hose that is further away from the handgrip element. As a result, the suction hose is, so to speak, a part of the handgrip element and can be better grasped by the operator.

The handgrip element is preferably rod-shaped. In principle, however, it would also be possible for the handgrip element to have an arc shape that can be grasped by the operator. For example, the handgrip element is designed in the manner of a grab bar.

The contact body expediently has a passage opening for the working tool in the area of the contact surface. The passage opening is designed, for example, in the manner of a window. However, it is also possible for the working tool to penetrate into the workpiece next to the contact body or next to the guide device when the guide device is in operation. The contact surface or a portion of the contact surface in each case preferably extends laterally next to the passage opening for the working tool. The passage opening for the working tool can be open laterally or be surrounded by the contact surface in a ring shape.

It is furthermore advantageous if the inflow opening is arranged on or in the area of a working area in which the working tool penetrates the workpiece when the guide device is used. For example, the inflow opening is provided on or in a side wall of the contact body which is angled with respect to the contact surface and adjoins the working area. It goes without saying that several, for example at least two, inflow openings can be present which communicate with the dust removal channel or several dust removal channels. For example, two or more inflow openings can be arranged in a ring around the working area, in particular the passage opening, for the working tool, so that dust can be extracted from the working area or the area of the passage opening from several sides or at several angles.

The handgrip element preferably has a longitudinal axis which extends in the direction of a working area in which the working tool penetrates the workpiece and/or is oriented in the direction of the aforementioned passage opening for the working tool, in particular its center, when the guide device is used. The handgrip element protrudes from the center or the working area for the working tool, so to speak, in the form of a beam.

The handgrip element preferably has a length which corresponds approximately to the width of an adult's hand. A length of the handgrip element is preferably about 10 cm to 15 cm. The handgrip element preferably has a diameter of about 1 cm to 3 cm so that it can be ergonomically grasped.

A rubber coating can be provided on the handgrip element and/or a handgrip contour, in particular a finger contour.

The handgrip element is preferably rigid.

The handgrip element can be firmly connected to the contact body. For example, the handgrip element can be bonded, welded, or otherwise non-detachably connected to the contact body. It is also possible for the handgrip element and the contact body to be a single piece or to be formed by a common body.

The handgrip element is preferably firmly mounted on the contact body or releasably connectable or connected thereto.

For example, a screw connection means or a plug connection or both are provided for fastening the handgrip element to the contact body. The screw connection means include, for example, screw contours that are present on the handgrip element and on the contact body. The plug connection comprises, for example, a plug projection on a plug-in mount. A screw thread can preferably also be provided on a plug connection.

The following measure is also advantageous for ergonomics: A longitudinal axis of the handgrip element expediently has an angle to the contact surface so that the handgrip element protrudes from the contact body in a direction towards the mounting bracket obliquely with respect to the contact surface. However, the longitudinal axis is at an angle to the contact surface such that the handgrip element is closer to the contact surface than to the mounting bracket. The angle with respect to the contact surface is, for example, approximately 10° to 45°.

The guide assembly can, for example, have a pivot bearing, a pivot guide, a curved guide, or a curved guide track. However, a linear guide is preferred. For example, the guide assembly has a linear guide and/or an elongated guide body, for example a guide rod. The linear guide or the guide body extends along a guide axis that is angled, for example, at a right angle with respect to the contact surface. An angular position of the linear guide with respect to the contact surface can be a fixed angular position. However, it is also possible, for example, to produce inclined bores or inclined milled holes so that the linear guide is angularly adjustable with respect to the contact surface, for example by means of a corresponding pivot bearing. In addition, fixing means are provided in this case for fixing the guide assembly position relative to the contact body, for example a clamping screw, latching means, or the like.

The guide assembly expediently has two elongated and/or rod-shaped guide bodies on which the mounting bracket is displaceably mounted. The guide bodies extend parallel to one another and the mounting bracket is arranged between the guide bodies. In this way, optimal guidance is possible. However, only a single guide body, for example a guide rod, a guide groove, or the like, can also easily be provided. Of course, further guide bodies are also possible, for example three guide bodies which are arranged parallel to one another and in corner areas of a triangle.

The mounting bracket is expediently mounted, in a guide plane, on a guide body of the guide assembly and a center of the mounting bracket parallel to the contact surface is located in a plane parallel to the guide plane. This means that there is a transverse distance, so to speak, between the guide planes. The guide planes preferably extend at an angle with respect to the contact surface, in particular at a right angle.

The guide device is preferably provided for operation with a guide rail. For example, the guide device, in particular its contact body, has a guide contour for guiding on a guide rail that can be placed on the workpiece. The guide contour can, for example, be a side wall surface and/or include a mounting groove or guide groove. Of course, the guide contour can also be a guide projection for engaging a guide mount of the guide rail. The guide rail has, for example, a guide rib or a guide projection which is provided for engagement with the guide groove. The guide groove and the guide projection, which are arranged on the guide device and the guide rail or vice versa, expediently have an elongated shape and extend along a longitudinal direction or a guide axis. In particular, the guide device can be mounted on the guide rail in a longitudinally displaceable manner on the basis of the guide contour. It is readily advantageous if several guide contours, for example guide grooves and/or support surfaces or guide surfaces are provided that extend parallel to the aforementioned longitudinal guide axis.

Another advantageous design provides that the guide device has a positioning device with at least one positioning body for engaging with a positioning recess for positioning the guide device relative to the positioning recess. The positioning body is spaced apart, for example, from the central axis of the working tool when it engages with the workpiece. The positioning recess can, for example, be a workpiece recess, in particular a bore in the workpiece. Furthermore, it is also advantageous if the positioning recess has a recess on a guide rail, for example the aforementioned guide rail suitable for longitudinal guidance of the guide device. A row arrangement with several positioning recesses is preferably provided on the guide rail. The positioning recesses can, for example, be provided at regular or equal intervals and/or be equidistant.

The at least one positioning body can protrude permanently in front of the contact surface or be in a positioning position in which it can optionally engage with the positioning recess. However, it is advantageous if the positioning body on the guide device is adjustable on the guide device between a positioning position in which it engages with the positioning recess and/or protrudes in front of the contact surface, and a passive position in which it is removed from the positioning recess and/or from the contact surface, for example can be removed from the guide device or is displaceably mounted thereon. For example, a sliding bearing is provided for adjusting the positioning body between the positioning position and the passive position.

The positioning body is preferably spring-loaded into the positioning position or into the passive position by a spring assembly. The positioning body thus engages with the respective positioned recess, for example, due to the spring-loading. The opposite is also possible, that is to say that the operator, for example, actively actuates the positioning body in the direction of the positioned recess against the force of the spring assembly.

A locking device for locking the at least one positioning body in the positioning position and/or the passive position is also advantageous. The locking device can, for example, comprise a latching device, a screw thread, or other similar positioning means. The locking device can, for example, switch the aforementioned spring assembly passively so to speak, that is to say that the positioning body, which is spring-loaded into the positioning position, for example, can be locked in the passive position.

It is preferred if the guide device has several positioning bodies, for example at least two positioning bodies, between which a working area is arranged for the working tool for engaging with the workpiece. For example, the positioning bodies are provided opposite one another on the passage opening for the working tool.

More preferable is a system comprising a guide device according to any of the preceding claims and a guide rail that can be placed on the workpiece. The guide rail is particularly suitable for use with the guide device in that it has, for example, a counter-guide contour, in particular a guide rib, for a guide contour, in particular a guide groove, for guiding the guide device on the guide rail along a guide axis. The guide rib engages with a guide groove, in particular on the contact surface of the guide device, and enables linear guidance along the guide axis. Several counter-guide contours, for example guide projections, are preferably provided on the guide rail, which guide projections are spaced apart from one another transversely in a direction transverse to the guide axis. Corresponding thereto, the guide device has several guide contours, for example guide mounts, which are spaced apart transversely in the direction transverse to the guide axis. Furthermore, it is advantageous if the guide rail has at least one positioning recess, in particular a row arrangement of positioning recesses, for engaging with a positioning body of the guide device.

It is preferably provided with the guide device that it comprises an attachment, which has an attachment housing and a drive element on a drive side that can be coupled to the machine output element of the hand-held power tool and, to drive the attachment, is firmly connected to or motion-coupled via a gear with an output element of the attachment, in which a tool mount for the working tool is arranged on the output element so that the drive of the hand-held power tool can drive the working tool via the attachment, in which the attachment has a fastening device on the drive side for detachable fastening to the hand-held power tool and at least one guide body protruding from the attachment housing, which guide body is provided and designed for grasping, particularly gripping, by an operator of the hand-held power tool and/or forms a component of a guide assembly for a guided relative adjustment of the tool mount of the attachment as relates to a contact body of the guide assembly, which contact body has a contact surface for having contact with a workpiece to be machined with the hand-held power tool.

The attachment forms, for example, an extension of a machine housing of the hand-held power tool and forms a support base, connected to the hand-held power tool, for the at least one guide body. This guide body can be, so to speak, a manually graspable guide body, for example a handgrip element. However, it is also possible that the guide body forms a component of a guide assembly, i.e. a linear guide for example, with which the tool mount of the attachment and thus also the hand-held power tool can be guided relative to the contact body. However, the guide assembly can also easily comprise or be a pivot guide. Such a guide assembly, which comprises guide rods for example, can also be grasped or gripped by the operator in order to move the hand-held power tool with respect to the workpiece to be machined.

It is advantageously provided that the at least one guide body is designed as a handgrip element. In particular, the handgrip element is elongated or rod-shaped. The handgrip element can, for example, comprise a recessed grip. The handgrip element preferably projects radially from the attachment housing with respect to an axis of rotation of the tool mount.

It is preferred if a mounting bracket for releasably holding the attachment housing is arranged on the guide body so that the at least one guide body can be detachably arranged on the attachment. An alternative possibility is that the guide body is durably arranged on the attachment housing, for example immoveably connected thereto, in particular screwed, bonded, welded, or is otherwise similarly materially connected. Furthermore, the guide body can form an integral part of the attachment housing.

It is preferred if the mounting bracket has a retaining mount, in particular a plug-in mount, for mounting, in particular for plugging in, the attachment. A simple plug-in assembly is thus possible. It is preferred if the hand-held power tool can only be mounted in the retaining mount with the attachment mounted thereon, that is to say that assembly of the hand-held power tool would not be possible without the attachment.

The mounting bracket advantageously has a latching device for latching the attachment and/or a locking device for locking the attachment. A latching device or locking device is particularly advantageous in connection with the aforementioned plug-in assembly. For example, the latching device or locking device comprises a latch or a lock which, in a latching position or locking position, engages with a latching mount or locking mount on the attachment. At this point it should again be noted that such a latching mount or locking mount is not regularly provided on a hand-held power tool. In contrast, the attachment advantageously has such a latching mount or locking mount, so that simple assembly or disassembly on the mounting bracket is possible.

The mounting bracket preferably comprises a clamp or a clamping ring for clamping the attachment or is formed thereby. The clamp or the clamping ring can preferably be actuated by a screw element, which can be adjusted by rotating the previously mentioned handgrip element between a clamping position, in which the attachment is held in a clamped fit on the clamp or the clamping ring, and a release position, in which the attachment can be removed from the clamping ring or the clamp.

It is also advantageous if the attachment housing has a standardized outer circumference. For example, it is advantageous if the attachment housing has a diameter of 43 mm. A clamp, known per se, from which a handgrip protrudes, can also be attached to an attachment housing with such a diameter.

It is preferable when the mounting bracket has at least one holding component that forms part of the guide device and is separate from the guide assembly, with the aid of which the tool mount can be adjusted between a working position intended for machining the workpiece and a tool change position intended for a tool change, in which tool change position the tool mount is adjusted further away from at least one component of the guide device, in particular the contact body, that obstructs or prevents a tool change, and is more accessible for the tool change than in the working position, the hand-held power tool being connected to the holding component in the working position and in the tool change position.

BRIEF DESCRIPTION OF THE DRAWINGS

Exemplary embodiments of the invention are explained below with reference to the drawing. The following is shown:

FIG. 1 is a perspective oblique view of a guide device with a mounting bracket and a hand-held power tool attached thereto;

FIG. 2 section D1 from FIG. 1;

FIG. 3 the guide device according to FIG. 1 from above;

FIG. 4 a sectional view of the guide device according to FIG. 3, approximately along section line A-A in FIG. 3;

FIG. 5 a side view of the arrangement of FIG. 5 in a tool change position;

FIG. 6 a section through the guide device according to FIG. 5, approximately along section line B-B;

FIG. 7 a further side view of the guide device according to FIG. 5, but in its working position;

FIG. 8 a perspective oblique view of the guide device according to the preceding figures in a state arranged on a guide rail;

FIG. 9 a variant of the guide apparatus according to FIG. 8 with a different variant of a guide rail;

FIG. 10 a cross-sectional view through the arrangement according to FIG. 9, approximately along section line C-C in FIG. 9;

FIG. 11 a variant of a handgrip element with a suction hose, approximately corresponding to cutout D3 in FIG. 10;

FIG. 12 a plan view of the mounting bracket according to FIG. 1 from above;

FIG. 13 an exploded view with the guide device according to FIG. 1, the hand-held power tool, and an attachment provided for attachment to the mounting bracket;

FIG. 14 the arrangement according to FIG. 13, in which the hand-held power tool is not yet mounted on the mounting bracket;

FIG. 15 the arrangement according to FIG. 14 with the hand-held power tool mounted on the mounting bracket;

FIG. 21 the hand-held power tool according to the preceding figures with an attachment mounted thereon and a further attachment;

FIG. 22 the hand-held power tool according to the preceding figures with an attachment mounted thereon two further attachments not yet mounted thereon;

FIG. 23 a section through a front part of the hand-held power tool according to FIG. 21 and its attachment, approximately along section line E-E;

FIG. 24 the attachment according to FIG. 22 but removed from the hand-held power tool and in a section along section line F-F in FIG. 21;

FIG. 25 an exploded view of the attachment according to FIGS. 22, 23 with enlarged detailed view D2;

FIG. 26 the attachment according to FIG. 25 obliquely from the front;

FIG. 27 a front part of the hand-held power tool according to the preceding figures;

FIG. 28 a drive side of a further attachment which is shown in

FIG. 29 perspectively obliquely from the front side thereof;

FIG. 30 a cross-section through the attachment according to FIGS. 28, 29 in a blocking position of its actuating device;

FIG. 31 a right part of the diagram according to FIG. 30, in which the actuating device is moved into its release position;

FIG. 32 an exploded view of the attachment according to FIGS. 28-31;

DETAILED DESCRIPTION

Figure 17:
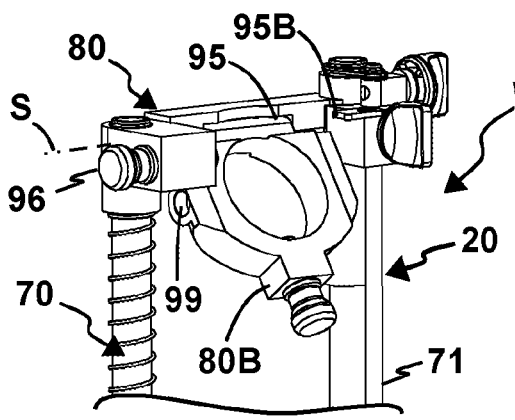
FIG. 17 the guide device according to the preceding figures with the mounting bracket partially pivoted from the working position into the tool change position according to FIG. 16, in a lateral oblique view.
Figure 18:
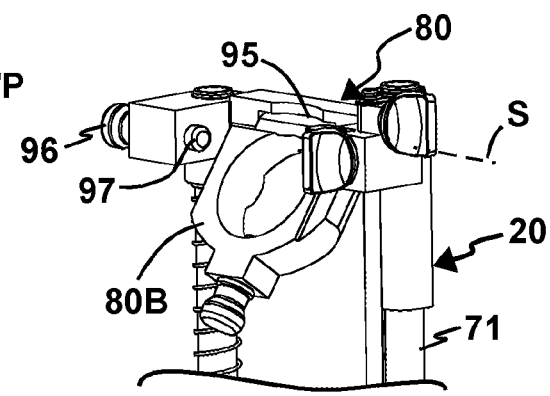
FIG. 18 the arrangement according to FIG. 17, but from an opposite side.
Figure 16:
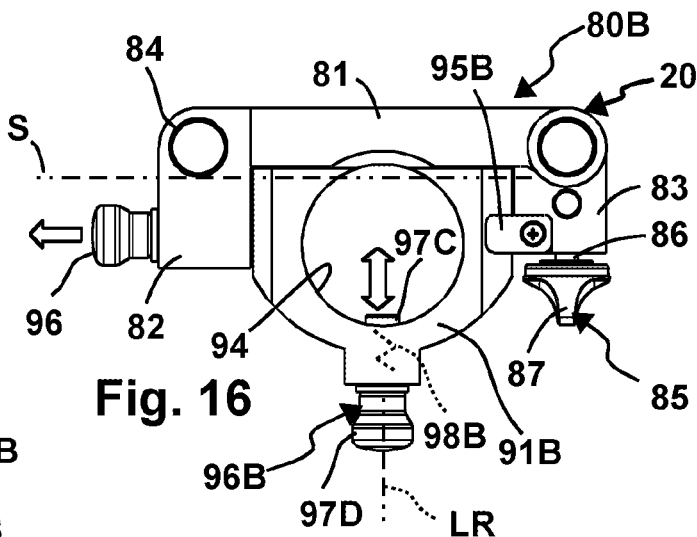
FIG. 16 a plan view of the mounting bracket according to FIG. 11 from above.
Figure 19:
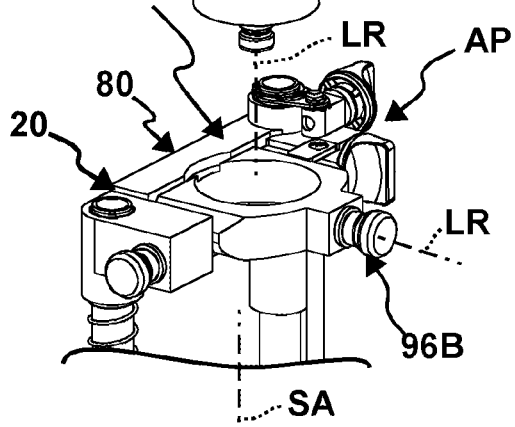
FIG. 19 the mounting bracket according to FIGS. 15-17 with an attachment to be arranged thereon.
Figure 20:
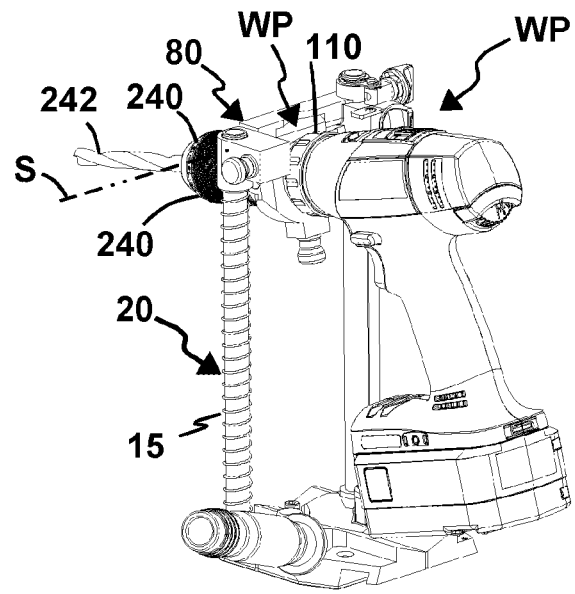
FIG. 20 the guide device according to FIGS. 15-19, which is adjusted into the tool change position and on which the hand-held power tool is arranged.
Figure 33:
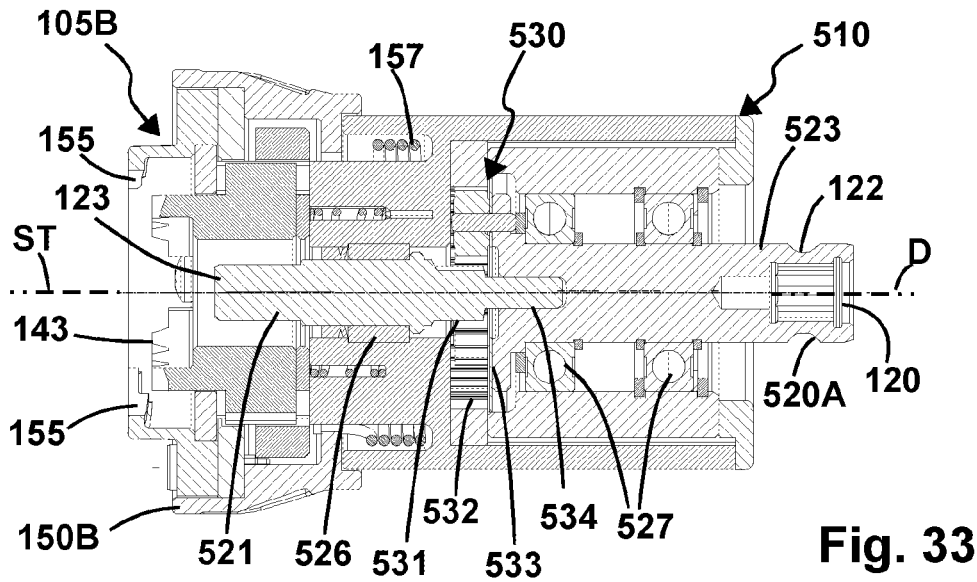
FIG. 33 a cross-section through an attachment with a speed-changing gear.
Figure 34:
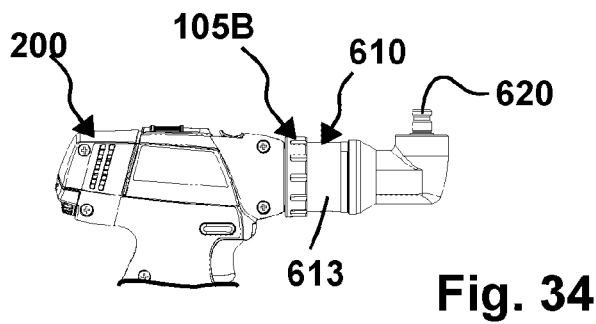
FIG. 34 a side view of the hand-held power tool with an attachment in the form of an angle attachment.
Figure 35:
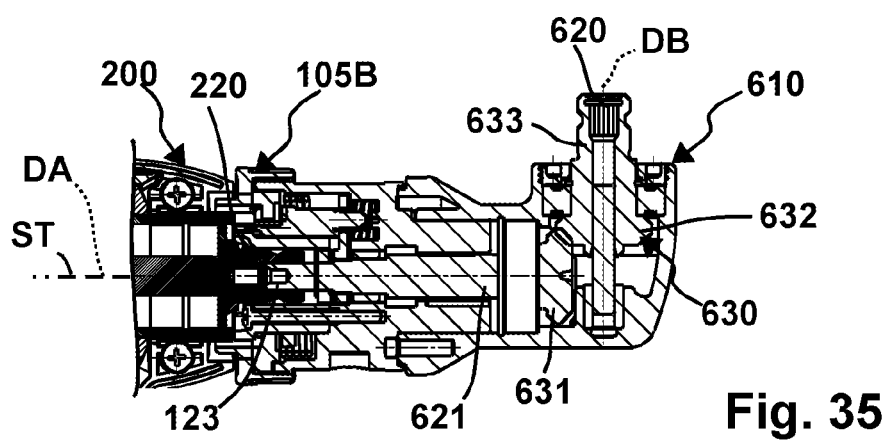
FIG. 35 the arrangement according to FIG. 34 in cross-section.

A system 10 comprises a guide device 20 and a hand-held power tool 200. A workpiece W can be machined with the system 10, in which, for example, bores BO can be made in a workpiece upper side WO of the workpiece W.

The hand-held power tool 200 comprises a machine housing 201 with a drive section 202 in which a drive motor 210 is arranged. A handgrip section 203 projects from the drive section 202, on which, for example, a switch 212 is arranged for actuation by an operator in order to switch the drive motor 210 on or off or to influence its speed.

An energy storage device 211, for example a battery pack, is also arranged on the handgrip section 203, with which energy storage device the drive motor 210 and, if necessary, the controlling and/or monitoring components of the hand-held power tool 200 can be supplied with electrical energy. As an alternative or in addition to the energy storage device 211, however, a power cord or other similar supply device can also be provided for supplying the hand-held power tool 200.

The drive motor 210 drives a tool mount 220 for mounting a working tool, for example a screwdriver bit, drill, or the like, directly or via a gear 214. The tool mount 220 can be driven to rotate about an axis of rotation D by the drive motor 210. A direction of rotation of the drive motor 210 can be specified and changed using a direction-of-rotation switch 213.

The tool mount 220 is provided on the front, free end region of a machine output element 221, which protrudes in front of a neck section of the drive section 202 of the machine housing 201.

The machine output element 221 has a retaining recess 222 on its radial outer circumference, which is suitable, for example, as a locking mount for a locking element of an attachment. In the present case, however, a support body 230, which is, for example, plate-like, is provided for fastening the attachments of the hand-held power tool 200, which are explained below. The machine output element 221 protrudes in front of the support body 230.

The support body 230 has a support surface 232 on its end face 231 for supporting an attachment, for example attachment 110. Counter-anti-rotation contours 233 are advantageously provided on the support surface 232, for example recesses or form-fit mounts 234, which are used to engage with anti-rotation contours of an attachment to support the attachment in a non-rotatable manner. The form-fit mounts 234 extend in a star shape around the axis of rotation D. It is preferred if the form-fit mounts 234 have the same angular distances from one another.

Counter-locking contours 235, for example bayonet contours 236, protrude radially outward in front of the support body 230. An annular recess 237 extends around the support body 230 so that when an attachment is plugged in or mounted, its locking contours can be inserted between the counter-locking contours 235 into the recess 237 and brought into rear engagement with the counter-locking contours 235, i.e. the bayonet contours 236, by being rotated about the axis of rotation D.

A tool chuck 240, for example a drill chuck, can be fastened directly to the tool mount 220. The tool chuck 240 has, for example, a tool holder 241, for example with clamping jaws not shown in the drawing but known per se, for a working tool 242, for example a drilling tool. A quick and simple attachment of the tool chuck 240 to the tool mount 220 ensures, for example, that it is brought into engagement with the machine output element 221 with a type of quick-coupling, for example by means of locking elements, in particular balls, which come into engagement with the retaining recess 222 under spring load and can be placed in the direction of their unlocking position by means of a release handle 243, for example an actuating ring, in which they are out of engagement with the retaining recess 222 so that the tool chuck 240 can be removed from the tool mount 220.

A hands-free mode of operation that is possible at any time ensures that an operator makes the bores BO in the workpiece W, for example, by engaging the handgrip section 203 of the machine housing 201, which handgrip section protrudes like a pistol, and then making the corresponding holes or bores in the workpiece W.

An angularly correct, in particular perpendicular, incorporation of bores LO into the workpiece W using the hand-held power tool 200 is facilitated by a guide device 20. The guide device 20 comprises a contact body 21, which can be placed making contact with the workpiece W, in particular its workpiece upper side WO, with a contact surface 22. The contact surface 22 is provided on a lower side 23 of the contact body 21, which supports a guide assembly 70 on its upper side 24.

The guide assembly 70 comprises guide bodies 71 which are designed, for example, in the shape of a rod. The guide bodies 71 protrude at an angle, for example at a right angle, from the upper side 24 of the contact body 21. The guide bodies 71 extend parallel to a guide axis F.

A slide 74 is mounted on the guide bodies 71 so as to be linearly adjustable. The guide bodies 71 form components of a linear guide 73. The slide 74 has bearing mounts 84, for example guide bushings or the like, which are penetrated by the guide bodies 71 such that the slide 74 is mounted on the guide bodies 74 so as to move linearly parallel to the guide axis F.

The slide 74 is used to hold the hand-held power tool 200 so that it can be adjusted along the guide axis F, between a position furthest away from the contact body 21, an inactive position IS, and penetration positions ES, which are adjusted closer to the contact body 21, by means of the linear guide 73, so that the working tool 242 penetrates the workpiece W guided along the guide axis F, e.g. in order to produce bores in the workpiece W. Since the contact surface 22 and the guide axis F are orthogonal to one another, the bores L2 made by the working tool 242 designed as a drill are perpendicular or at right angles to the workpiece upper side WO.

The slide 74 is loaded in the direction of the inactive position IS by a spring assembly which comprises, for example, one or more springs 72. The spring 72 is supported, on the one hand, on the contact body 21 and, on the other hand, on the slide 74 and is penetrated by one of the guide bodies 71.

A number of setting positions, for example setting positions T1 and T2 and other setting positions, can be set using a depth stop device 75. The depth stop device 75 comprises, for example, a depth stop body 76, which is mounted displaceably on one of the guide bodies 71 parallel to the guide axis F and can be releasably fastened in a respective setting position T1, T2 to be set using a fastening device, for example a clamping device 77.

The depth stop body 76 comprises, for example, a clamp of the clamping device 77, which can be adjusted by an actuating element 78, for example a screw with an actuating handle, between a release position in which the depth stop body 76 is displaceable on the guide body 71 and a clamping position in which the depth stop body 76 is held stationary on the guide body 71. The slide 74 strikes the depth stop body 76 in the respectively set or fixed setting position T1, T2 or other setting positions.

A movement path of the slide 74 on the linear guide 73 is also limited in a direction away from the contact body 21, namely by a height stop device 79. This height stop device comprises a height stop body 79A, which can be fixed on the guide body 71, likewise by means of the clamping device 77, in a respective longitudinal position as relates to the guide axis F and can also be adjusted, by an actuating element 78, between a clamping position fixed on the guide body 71 and a release position, in which the height stop body 79A is displaceable along the guide body 71 and optionally also removable therefrom.

Furthermore, the slide 74 can be fixed on the guide assembly 70 in one or more longitudinal positions parallel to the guide axis F, namely by means of a fixing device 85. The fixing device 85 comprises, for example, a fixing element 86, for example a clamping screw, which comprises an actuating handle 87 for manual actuation by an operator and the free end of which protrudes into one of the bearing mounts 84. The fixing element 86 can be adjusted between a clamping position in which, for example, a free end of the fixing element 86 is supported, in a clamped fit, on the guide body 71 penetrating the bearing mounts 84, so that the slide 74 is stationary with respect to the guide assembly 70, and a release position in which the free end of the fixing element 86 is spaced apart from the guide body 71 and thus the slide 74 is displaceable along the guide assembly 70.

A mounting bracket 80 for releasably attaching the hand-held power tool 200 is provided on the slide 74. The mounting bracket 80 comprises a base body 81 from which side legs 82, 83 protrude at an angle, for example at a right angle. The base body 81 and the side legs 82, 83 form an overall approximately U shape.

The bearing mounts 84 are provided, for example, on the longitudinal end regions of the base body 81 or in the angled sections between the base body 81 and the side legs 82, 83.

The mounting bracket 80 comprises a retaining mount 94 for mounting and retaining the hand-held power tool 200. The retaining mount 88 is provided on a holding body 89 which is held on the base body 81. An embodiment not shown in the drawing could provide that the base body 81 has the retaining mount 88 and/or that the holding body 89 is arranged firmly and immovably on the base body 81.

The holding body 89 comprises a clamping bracket 91 which, together with a base leg body 92, delimits the retaining mount 88. The clamping bracket 91 can be adjusted relative to the base leg body 92 in the sense of narrowing or reducing the cross-section of the retaining mount 88 with the aid of a fixing device 93. The fixing device 93 comprises, for example, a clamping screw 94 which penetrates the clamping bracket 91 and is screwed or can be screwed into the base leg body 92. The fixing device 93 thus forms a clamping device with which, for example, the neck section 204 or an attachment 110, which can be releasably fastened to the hand-held power tool 200, is fixed to the guide device 20.

If, for example, the neck section 204 has a corresponding length, it can be fixed directly by the fixing device 93. A preferred embodiment, however, provides that the attachment 110 is arranged on the neck section 204 or the front side of the hand-held power tool 200, which, so to speak, extends the neck section 204 and thus provides a fixing base or clamping base for the fixing device 93, with which the hand-held power tools 200 can be releasably attached to the guide device 20. The attachment 110 has a tool mount 120 which is rotatably coupled or non-rotatably connected to the tool mount 220 of the hand-held power tool 200. When the attachment 110 is fastened to the hand-held power tool 200, the tool mount 120 forms, so to speak, the tool mount of the hand-held power tool 200.

The tool chuck 240 can optionally be attached to the tool mount 220 of the hand-held power tool 200 or to a tool mount 120 of the attachment 110, which is directly coupled to the tool mount 220 when the attachment 110 is attached to the hand-held power tool 200.

In the present case, it is provided that the holding body 89 is adjustable, between a working position AP and a tool change position WP by means of a pivot bearing 95, about a pivot axis S with respect to the base body 81 and/or the slide 74. In the working position AP, the working tool 242 is parallel to the guide axis F and/or oriented perpendicular to the contact surface 22 and can thus be used for drilling holes LO. In contrast, in the tool change position WP, the axis of rotation D of the tool mount 220 is pivoted away from the contact surface 22 and/or the contact body a 21, for example by at least 45°, preferably by more than 45°, in particular about 90°, so that the tool mount 220 for a tool change, i.e. for changing the working tool 242 on the tool mount 220 or on the tool chuck 240 arranged thereon.

The holding body 89 forms a holding component 90 with which the tool mount 220 can be adjusted, namely can be pivoted, between the working position AP and the tool change position WP. In the working position AP, the elongated working tool 242, for example a drill, lies opposite the contact body 21 and is also arranged between the guide bodies 71, both of which enable a tool change of the working tool 242 on the tool holder 241 or the tool chuck 240 on the tool mount 120 and thus also a tool change at the components 15 on the tool mount 220 which are at least making a tool change cumbersome. In the tool change position AP, however, the tool mounts 120, 220 and the tool chuck 240 arranged thereon along with the tool holder 241 are pivoted away from these two components 15 (see, for example, FIG. 5) such that the working tool 242 and/or the tool chuck 240 are easily accessible and are therefore available for a tool change.

The holding component 90 can be locked with respect to pivoting about the pivot axis S by means of a locking device 96. The locking device 96 comprises, for example, a lock 97 which is displaceably mounted in a bearing mount 97B. The bearing mount 97 is provided, for example, on the side leg 82 of the mounting bracket 80. The lock 97 is mounted on the mounting bracket 80, for example, parallel to the pivot axis S so as to be displaceable about a sliding axis which is at a transverse distance away from the pivot axis S. The lock 97 is preferably loaded into its locking position by a spring 98, which is mounted in the bearing mount 97B. In the locking position, the lock 97 engages with a locking mount 99, for example on the holding body 89. The operator can conveniently unlock the locking device 96, for example, by pulling on an actuating element in a direction away from the holding body 89 in order to move the lock 97 out of the locking mount 99 against the force of the spring 98. The holding component 90 and thus also the hand-held power tools 200 attached thereto can then be pivoted between the working position AP and the tool change position WP.

In the working position AP, the holding body 89 preferably strikes a stop 95B, which protrudes in front of one of the side legs 82 or 83 or the base leg 81 of the dismantling bracket 80.

Another favorable possibility for adjusting the tool mount 220 between the tool change position WP and the working position AP is implemented using the attachment 110 and a particularly simple assembly of the hand-held power tool on the guide device 20 using the attachment 110 and an alternative mounting bracket 80B.

The attachment 110 has no function in relation to the tool drive or the drive train of the hand-held power tool 200, i.e. the attachment 110 has no torque-converting or speed-changing component, but merely serves to enable a quick tool change.

The attachment 110 forms a further holding component 90B with which the tool mount 20 and/or 120 is adjustable between the working position AP and a tool change position WP apart from the guide device 20. In this variant, the attachment 110 forms a component of the guide device 20, which component can remain on the hand-held power tool 200 for tool change and is detachably fastened by the guide device 20. Removing and arranging the hand-held power tool 200 with the attachment 110 arranged thereon takes place quickly and with few manual interventions, as will become clearer below:

A particularly simple assembly of the hand-held power tool 200 on the guide device 20 is possible with the mounting bracket 80B. To the extent that the mounting bracket 80B has the same or similar components as the mounting bracket 80, the same reference numerals are used. The mounting bracket 80B comprises, for example, the base body 81 with its side legs 82, 83 and further preferably also the pivot bearing 95.

The mounting bracket 80B has a holding body 89B on which the retaining mount 88 is provided for holding the machine housing 201 and/or preferably the attachment 110 attached to the machine housing 201.

The attachment 110 can be inserted into the retaining mount 88 and locked there by a locking device 96B. The locking device 96B comprises, for example, a lock 97C which is loaded by a spring 98B into a locking position in which it engages with a locking mount 99B on the attachment 110.

The lock 97C is mounted linearly along a linear axis LR, for example on the holding body 89B, and can be grasped by an operator at a handgrip 97D so that it can be disengaged from the locking mount 99B against the force of the spring 98B. The attachment 110 attached to the hand-held power tool 200 can be inserted into the retaining mount 88 along a plug-in axis SA and is then automatically locked in the retaining mount 88 by the lock 97B, which is loaded by the spring 98B. The linear axis LR or the displacement axis of the lock 97C and the plug-in axis SA extend at an angle, preferably at a right angle, to one another.

Only the locking device 96B has to be released for a tool change, in which the attachment 110 is then released, and thus the hand-held power tool 200 with the attachment 110 arranged thereon and the tool chuck 240, which is holding the working tool 242 and which is attached to the attachment 110, can be removed from the guide device 20. The tool holder 241 is then easily accessible in order to change the working tool 242. In this case, the pivot bearing 95 is optimal for a convenient tool change, but not necessary.

Of course, it is readily possible for the attachment 110, for example, to also be clamped in the retaining mount 88 of the holding body 89, for example to be clamped between the clamping bracket 91 and the base leg body 92.

It is also possible that a locking mount in the manner of the locking mount 99B for the locking device 96 is present directly on the neck section 204 of the hand-held power tool 200 if the neck section 204 has a cylindrical section with sufficient length with respect to the plug-in axis SA for insertion into the retaining mount 88.

The contact body 21 forms, so to speak, a free end region or contact region or support region of the guide assembly 70 and serves to abut or support the guide device 20 on the workpiece W.

The contact body 21A has an essentially plate-like shape, with transverse sides, in particular narrow sides, extending between its upper side 24 facing the mounting bracket 80 and its lower side 23 having the contact surface 22, namely transverse side 25, in the area of which the guide bodies 71 are arranged, one transverse side 26 which is opposite therefrom, rearward so to speak, and transverse sides 27, 28 extending between said transverse sides 25, 26.

A coating or a covering 29 is preferably provided on the contact surface 22 or the lower side 23 of the contact body 21, in particular a rubber coating or other similar type of slip-resistant covering.

The contact body 21 has a passage opening 30 through which the working tool 242 can be adjusted to be in front of the contact surface 22 and thus into the workpiece upper side WO. The passage opening 30 is a window, so to speak, through which the working tool 242 can penetrate into the workpiece W.

Dirt results during the machining of the workpiece W, in particular chips and dust and other similar particles. To remove such dirt or dirt particles, a suction device SV can be connected to the guide device 20 with a suction hose SL, through which a particle flow PS with dirt particles can be extracted from the area of the passage opening 30, which provides a working area AB of the guide device 20.

The suction of the particle stream PS from the guide device 20 takes place through a handgrip element 40 to which the suction hose SL is connected or can be connected. The handgrip element 40 can be comfortably grasped by an operator, in which the operator at the same time positions and/or holds the guide device 20 with respect to the workpiece W, and additionally holds the suction hose SL stationary in the area of the guide device 20 or positions it relative to the workpiece W.

For a corresponding load capacity for use in a workshop or for use at or on a construction site, a suction hose must have a mechanical load capacity which is also associated with a certain rigidity and a certain weight, i.e. the suction hose exerts forces onto the guide device 20 in the sense of a change in position of the guide device 20 with respect to the workpiece W when it is connected thereto. Since the suction hose SV is connected to the handgrip element 40, the operator holds not only the guide device 20, but at the same time also the suction hose SV firmly in place when the guide device 20 is used to make the bores LO.

An inflow opening 32 for the particle flow PS, which inflow opening communicates with a mount 33 for the handgrip element 40 and is fluidically connected thereto, is provided on a side wall 31, which delimits the passage opening 30 and thus the working area AB on one side.

The handgrip element has a tubular body 41 with a handgrip section 42 for grasping, in particular gripping, by an operator.

At one end region of the handgrip section 42, a mounting section 43 is provided which can be inserted and/or screwed into the mount 33 of the contact body 21. For example, screw connection means 44, for example screw threads, which can be screwed into one another, are provided on the inner circumference of the mount 33 and on the outer circumference of the mounting section 43. When the assembly section 43 is screwed into the mount 33, a flange 45 preferably rests on the contact body 21, for example its reverse side 28, between the assembly sections 43 and the handgrip section 42.

At the end region opposite the mounting section 43, the tubular body 41 has a suction hose connection 46 to which the suction hose SL can be connected.

The handgrip element 40 has a longitudinal shape and extends along a longitudinal axis LH.

The handgrip element 40 can be inserted and/or screwed, parallel to its longitudinal axis LH, into the mount 33. It is also possible that no screw connection means 44 are provided, but clamping means and/or locking means, for example, provided instead. For example, the handgrip element 40 can be inserted into the mount 33 and held in the mount 33 in a clamped fit. Furthermore, it is possible for corresponding bayonet contours, which can be brought into locking engagement, to be arranged on the inner circumference of the mount 33 and on the outer circumference of the handgrip element 40. Furthermore, the handgrip element 40 can be locked in the mount 33 by a locking element, for example a lock that is movably, in particular pivotably or displaceably, mounted on the contact body 21 transverse with respect to the longitudinal axis LH. It is also possible that the handgrip element 40 and the contact body 21 are firmly connected to one another, for example bonded, welded, or the like, or that the handgrip element 40 and the contact body 21 are formed as one piece.

The suction hose SL can be attached to the suction hose connection 46 parallel to the longitudinal axis LH. Corrugation 47, which preferably extends transverse with respect to the longitudinal axis LH, serves to hold the suction hose SL securely on the handgrip element 40. Locking contours, for example bayonet contours, can be provided between the suction hose SL and the suction hose connection 46. Furthermore, the suction hose SL can be held on the suction hose connection 46 in a clamped fit.

The handgrip element 40 and the contact body 21 thus form a dust removal device 35 which has a dust removal channel 36. The inflow opening 32 and/or the mount 33 forms an end region 37, and an outflow opening 39 of the handgrip element 40, to which the suction hose SL can be or is connected, forms end regions of the dust removal channel 36.

A flexural rigidity of the suction hose SV has already been mentioned. One embodiment can also provide that a handgrip element 40B arranged on the contact body 21 is shorter with respect to the longitudinal axis LH than handgrip element 40, and an end section SVE of the suction hose SV, which end section is connected to the handgrip element 40B, forms part of the handgrip element 40B.

For better support of the guide device 20 on the workpiece W and/or a guide rail, support bodies can be provided, preferably those which are immovably or movably arranged on the contact body 21. For example, a support body assembly 60 is provided which comprises a support body 61 movably articulated on the contact body 21. The support body 61 is pivotably mounted on the contact body 21 by means of a pivot bearing 62, which has a pivot axis preferably parallel to the guide axis F, and the support body has a support leg 63 at its free end region facing away from the mounting for support on the workpiece W, for example.

In a transport position, the support body 61 must be pivoted close to the contact body 21 so that it does not or only slightly protrudes in front of it; while in a support position, it is pivoted away from the contact body 21 so that a support surface of the support bushing 63, which lies in a plane with the contact surface 22, is spaced apart from the contact surface 22.

A side stop device 65 is also advantageous. The side stop device 65 comprises a side stop body 66 with a support surface which is angled with respect to the contact surface 22 and protrudes in front of the contact surface 22. The contact surface 22 can thus be supported on a workpiece upper side WO of the workpiece W, and the support surface of the side stop body 66 can be supported on a workpiece side surface WS which is angled with respect to the workpiece upper side WO.

A distance between the support surface of the side stop body 66 and the contact surface 22 can be set by a guide body 67 which is immovably or detachably attached to the contact body 21. The guide body 67 preferably has a rod-like shape. The guide body 67 preferably projects laterally in front of the contact body 21 in a plane parallel to the contact surface 22. The side stop body 66 is mounted displaceably on the guide body 67 along a longitudinal axis so that the support surface of the side stop body 66 can assume different distances away from the contact surface 22. In the respective longitudinal positions, the side stop body 66 can be fixed in place on the guide body 67, for example by means of a clamping device 68. The clamping device 68 comprises, for example, a clamping screw. Latching of the side stop body 66 with respect to the guide body 67 would also be readily possible.

The guide device 20 can be used together with a guide rail 410. The guide rail 410 has a rail body 411 and can be placed onto the workpiece W with its lower side 412 and has guide contours 414, 419, for example guide ribs, on its upper side 413. The guide contours 414, 419 extend parallel to the longitudinal sides 415, 416 of the guide rail 410 between the longitudinal end regions 418, 417 thereof. A guide contour 34 or an assembly of guide contours 34 in a guide mount is provided on the contact body 21, into which guide mount the guide contour 414 of the guide rail 410 can engage so that the contact body 21 and thus the guide device 20 are guided or can be guided along a guide axis FA on the guide rail 410.

Guide rail 430 has the same or similar components and parts as guide rail 410, that is to say it extends, for example, between its longitudinal end regions 417, 418, between which longitudinal sides 415, 416 extend. The lower side 412 of the guide rail 430 can be placed on the workpiece W and, on its upper side 413 opposite the lower side 412, has guide contours 414, 419, for example guide ribs for guiding engagement with guide mounts of a contact body 21A, which can be provided instead of contact body 21. Contact body 21A has a support leg projecting further in front of the passage opening 30, on which support leg a further guide mount with guide contours 34A is provided.

For example, guide contour 414 is provided for engaging a guide mount on which the explained guide contours 34 are provided, while guide contour 419, in particular a guide rib, is provided for engaging the further guide mount with the guide contours 34A of the contact body 21A. Guide contours 414, 419, like guide contours 34, 34A, are spaced apart from the guide axis FA transversely. The contact body 21A is guided twice on the guide rail 430 at a distance apart from the guide axis FA transversely.

To produce bores or holes LO in the workpiece W at predetermined, preferably equal intervals, a positioning device 50 is provided. The positioning device 50 comprises, for example, at least one positioning body 51, in particular with a pin-like shape, which is provided for engaging with positioning recesses in the shape of holes LO, for example, that have already been drilled. The positioning body 51 can be adjusted on the contact body 21 between a positioning position in which it engages with the positioning recess, for example in that its positioning projection 53 engages with one of the holes LO, and a passive position in which it does not engage with the positioning recess and/or is at least aligned with the contact surface 22 or adjusted to back behind it. For example, the positioning body 51 is mounted so that it can be moved longitudinally along a positioning axis P in a bearing mount 55 of the contact body 21.

It is preferred if the positioning body 51 is spring-loaded into the passive position by means of a spring assembly, for example a spring 56. The spring 56 is supported, on the one hand, on a step of the bearing mount 55, and is supported, on the other hand, on a flange projection 50 of the positioning body 51.

The positioning projection 53 and a handgrip 52 for operation by an operator are provided on opposite longitudinal ends of the positioning body 51. An operator can use the handgrip 52 to adjust the positioning body 51 from the passive position into the positioning position against the force of the spring 56.

A lock is preferably provided for the positioning position. For example, the positioning body 51 can be rotated in the bearing mount 55 about the positioning axis P, so that locking contours provided on the positioning body 51, for example a section of the flange 54, can be brought into locking engagement with complementary counter-locking contours provided on the bearing mount 55, so that the positioning body 51 is mounted in the bearing mount 55 so as to be immovable with respect to the positioning axis P.

It is preferred if the positioning device 50 has several positioning bodies 51, for example two positioning bodies 51. For example, positioning bodies 51 are provided on opposite sides of the passage opening 30. Distances between the positioning axis P and thus the respective positioning projection 53 and an axis extending through the center of the retaining mount 88, that is to say, for example, the longitudinal center axis of the working tool 242, are preferably the same. Thus, regardless of whether an existing arrangement of holes LO has already been created in the workpiece W to the right or left of the guide device 20, one of the positioning bodies 51 can be moved into a hole of the already created arrangement of holes LO in order to use the working tool 242 to create another hole LO at a distance between its central axis and the positioning axis P of the positioning body 51 used.

However, it is also possible for a positioning device to interact with a guide rail, which is obvious from the example of the guide rail 430 associated with the contact body 21A. At the longitudinal end region of the leg of the contact body 21A, on which the guide contours 34A are arranged, remote from the passage opening 30, a positioning device 50A is provided which has a positioning body 51A, which is constructed similarly to positioning body 51 already explained. Positioning body 51A can thus be adjusted, for example, into a positioning position projecting in front of the contact surface 22 of the contact body 21A, where it can then engage with a positioning recess 436 of a row arrangement 435 of positioning recesses. The positioning recesses 436 are arranged, for example, on a guide rib 434 of the guide rail 430. In particular, the positioning recesses 436 are arranged next to one another parallel to the guide axis FA and/or are spaced equal distances apart from one another.

The drive side 111 of the attachment 110 is intended for mounting on the hand-held power tool 200 and has the tool mount 120 on an output side 112 opposite the drive side 111, into which tool mount, for example, a screwdriver bit can be inserted directly or the tool chuck 240 can be fastened.

The shaft element 121 has a retaining recess 122 for the tool chuck 240 in the region of the tool mount 120. On the drive side 111, the shaft element 121 has a drive section which forms a drive element 123 which can be coupled non-rotatably to the machine output element 221. For example, a hexagonal contour or other polygonal contour is provided on the drive element 123 as a rotary synchronization contour 123A. The drive element 123 can therefore be inserted into the tool mount 220, which has an inner circumferential contour accommodating the rotary synchronization contour 123A in a form-fit manner. The tool mount 120 is arranged integrally on the shaft element 121, so that the tool mount 120 or the output section of the shaft element 121 forms an output element 181 which is rotatably coupled directly to the tool mount 220 of the hand-held power tool 200 when the attachment 110 is arranged on the hand-held power tool 200.

An attachment housing 113 of the attachment 110 has a circumferential wall 114 which encloses an interior space 115 in which a shaft element 121 having the tool mount 120 is rotatably mounted. For example, bearing mounts 116, 117 for a bearing assembly for mounting the shaft element 121 are provided in the interior space 115. Bearings 126, 127, for example a ball bearing and a slide bearing, are mounted in the bearing mounts 116, 117, on which bearings the shaft element 121 with bearing sections 124, 125 is supported.

Retaining rings 128A, 128B, for example splint rings or the like, support the bearings 126, 127 with respect to the shaft element 121 and/or the shaft element 121 with respect to the attachment housing 113.

The output element 120A projects in front of a cover 131 on the output side 112. A support body 130, which forms part of the fastening means 130A, is arranged on the cover 131. The support body 130 has a support surface 132 which is penetrated by the shaft element 121, i.e. in front of which the tool mount 120 protrudes. Form-fit mounts 134 for forming anti-rotation contours 133 are arranged on the support surface 132. Furthermore, there are counter-locking contours 135, for example bayonet contours 136, on the radial outer circumference of the support surface 132. In addition to the counter-locking contours 135, a recess 137 is provided into which the locking contours, for example of the locking body 150 explained below, are inserted in order to then bring the locking contours 155 of the locking body 150 into engagement or rearward engagement with the counter-locking contours 135 by rotating the locking body.

With its drive side 111, the attachment 110 can be attached to the fastening means 130A of another attachment 110 or, as a rule, to a hand-held power tool, for example hand-held power tool 200, using a fastening device 105.

Anti-rotation contours 143, for example form-fit projections 144 of the fastening device 105 for form-fit engagement with the counter-anti-rotation contours 233 or form-fit mounts 234 of the hand-held power tool 200 or the anti-rotation contours 133 or form-fit mounts 134 of a further attachment 110, are arranged on the drive side 111 of the attachment 110. The anti-rotation contours 143 are provided on a support body 140, which is designed, for example, in the shape of a sleeve or ring. The support body 140 is penetrated by the shaft element 121, for example.

The form-fit projections 144 protrude from an end face of the support body 140, which end face provides a support surface 141 for supporting the attachment 110 on a support surface opposite thereto, for example support surfaces 132 or 232, in the direction of a support axis ST. By means of the anti-rotation contours 143, the attachment 110 is held on the hand-held power tool 200 or the further attachment 110 so as to be non-rotatable with respect to the support axis ST.

The support axis ST is coaxial, for example, with an axis of rotation DX of the shaft element 121, but could in principle also have an angular position or inclination with respect thereto.

The support body 140 is screwed to the attachment housing 113 by means of screws 146 which are inserted into the support body 140 from the end face 141 and which penetrate this support body parallel to the support axis ST. The screw connection using the screws 146 represents an anti-rotation mechanism around the support axis ST and, in addition, a tensile fastening of the support body 140 on the attachment housing 113 with respect to the support axis ST.

A locking body 150 of the fastening device 105 is mounted on the attachment housing 113 so as to be pivotable about the support axis ST. The locking body 150 is designed overall as an annular body which can be gripped by an operator on an actuating part 151, which advantageously has a gripping contour 152, for example corrugation. The actuation part 151 is designed, for example, as an actuation ring. The actuating part 151 is connected in a rotationally fixed manner to a locking part 153, which is also ring-shaped and/or is formed by an annular body. The actuation part 151 and the locking part 153 can be in one piece or be formed by different bodies, which are preferably firmly connected to one another. The actuating part 151 is arranged radially externally on the locking part 153 of the locking body 150. The locking part 153 has a sleeve-like annular projection 154 on which locking contours 155, for example bayonet contours 156, are arranged.

The attachment 110 can therefore be attached to the hand-held power tool 200 or another attachment 110 in that the anti-rotation contours 143 are brought into engagement with counter-anti-rotation contours 233 or 133 initially through plugging along the support axis ST, and the locking contours 155 are plugged in past counter-locking contours 235 or 135, and then the locking body 150 is rotated about the support axis ST, so that the locking contours 155 come into rearward engagement with counter-locking contours 235 or 135, and the locking body 150 assumes its locking position.

The rotational movement of the locking body 150 into the locking position is supported and secured by a spring assembly 157, so that the locking body 150 remains in its locking position even in the event of vibrations during operation or other similar mechanical influences. The spring assembly 157 comprises a torsion spring 158, the supporting ends 159 of which are supported, on the one hand, on the locking body 150 and, on the other hand, on the attachment housing 113 in a rotationally fixed manner with respect to the support axis ST.

Since the locking contours 155 have a large radial distance from the support axis ST, which is simultaneously the axis of rotation of the locking body 150, and there are inclined surfaces present, on the one hand, at bayonet contours 156 and/or, on the other hand, at bayonet contours 236 or 136, which inclined surfaces have a flat slope transverse with respect to the plug-in axis ST, a slight torque is sufficient to actuate the locking body 150 around the axis of rotation/support axis ST, in order to bring about a high clamping force parallel to the support axis ST for clamping the attachment 110 to the hand-held power tool 200 or the other attachment. Optimal tensioning is realized with respect to the support axis ST even with a low spring force of the spring assembly 157. To ensure that the torsion spring 158 can still have a high spring force, it forms a component that is radially external with respect to the support axis ST and is located between the support body 140 and the circumferential wall 114.

The locking body 150 is to be adjusted from its locking position into its unlocking position against the spring force of the spring assembly 157. Using the gripping contour 152, an operator can accordingly easily grasp the locking body 150 and rotate it into the unlocking position. The spring assembly 157 and an actuating device 160 are provided so that the locking body 150 does not have to be actuated into the locking position by the operator when the operator attaches the attachment 110 to the hand-held power tool 200 or another attachment 110.

The actuating device 160 comprises a blocking body 161 which is mounted in the attachment housing 113 so as to be displaceable parallel to the support axis ST. The blocking body 161 has actuating contours 162, for example actuating projections 163, which protrude in front of the end face 141 of the support body 140 in a blocking position of the blocking body 161.

The blocking body 161 is arranged radially externally on the circumferential wall 142 of the support body 140 with respect to the support axis ST. The blocking body 161 has a passage opening 164 for the support body 140 on an annular section 166. In the area of the passage opening 164, anti-rotation contours 165 are provided on the blocking body 161, which are in engagement with anti-rotation contours 145 on the circumferential wall of the support body 140, so that the blocking body 161 is secured against rotation on the support body 140 with respect to the support axis ST.

Although the blocking body 161 is held non-rotatably on the attachment housing 113 with respect to the support axis ST, it is mounted movably parallel to the support axis ST, for example mounted on the support body 140 so that it can move linearly.

The actuation projections 163 and stop projections 167 protrude from the annular section 166 of the blocking body 161 on mutually opposite sides. The stop projections 167 strike the stops 118 of the attachment housing 113 when the blocking body 161 is moved into the attachment housing 113 along the support axis ST in the direction of a release position, in which the blocking body 161 releases a rotary movement of the locking body 150 in the direction of its locking position.

The blocking body 161 is loaded by a spring assembly 170 opposite the release position, i.e. in a blocking position, in which the blocking body 161 blocks an adjustment of the locking body 150 from its unlocking position into its locking position and in which the actuating projections 163 protrude in front of the end face 141 of the support body 140. The spring assembly 170 comprises springs 171, which are directly supported in the area of the stops 118 on the attachment housing 113 and, on the other hand, on steps of the stop projections 167, and thus directly loads the blocking body 161 in the direction of its blocking position. Further springs 172 are supported on a support body 173 and on the attachment housing 113, also in the area of the stops 118, the support body 173 in turn loading the blocking body 161 in the direction of the blocking position.

The support body 173 provides a substantially tilt-proof support of the blocking body 161 by the springs 172 by distributing their force evenly to the stop projections 176, which penetrate through passage openings 174 of the support body 173 but are supported on steps 168 thereon. Furthermore, the passage openings 174 are penetrated by the springs 171, so that they can act on the blocking body 161 in the direction of its blocking position directly and unobstructed by the support body 173. The support body 173 is penetrated by the shaft element 121 at a passage opening 175.

The blocking body 161 can be adjusted from its release position into its blocking position by means of an actuating gear 180. The actuating gear 180 can be actuated by the locking body 150, namely in that a gear body 181 of the actuating gear 180 is motion-coupled to the locking body 150 or is firmly connected thereto. For example, rotary synchronization contours 182 and 183 are provided on the gear body 181 and the locking body 150, which interlock in a form-fit manner and couple the gear body 181 in a rotationally fixed manner to the locking body 150 with respect to the support axis ST, which is simultaneously the axis of rotation or pivot axis of the locking body 150.

On a side facing away from the locking body 150, the gear body 181 has a planar surface 184 into which actuating bevels 185 extend obliquely, so that a step 186 is formed between a respective actuating bevel 185 and the planar surface 184.

The actuating bevels 185 and the steps 186 serve to interact with a gear body 187, which is provided for the axial adjustment of the blocking body 161 with respect to the support axis ST. In the present case, the gear body 187 is formed by the blocking body 161 or is arranged thereon. For example, the annular section 166 is designed as a gear body 187. An end-face planar surface 188 is also provided on the gear body 187, which end-face planar surface lies opposite planar surface 184. Actuating bevels 189 extend away from the planar surface 188, a step 186 being provided between the plane of the planar surface 188 and a respective actuating bevel 189.

The gear bodies 181, 187 are designed, for example, as annular bodies or rings. The gear bodies 181, 187 are penetrated by the support body 140, for example.

The actuating bevels 185, 189 extend in an arc-shaped, rising manner around the support axis ST. When the locking body 150 is rotated about the support axis ST or its pivot axis or axis of rotation, the actuating bevels 185, 189 slide along one another.

In the blocking position of the blocking body 161, the steps 186 are in engagement with one another. The spring assembly 170 loads the blocking body 161 in the direction of the locking body 150, the interlocking steps 186 preventing rotation of the locking body 150 about its axis of rotation or the support axis ST.

When the actuating contours 162 and thus the blocking body 161 are actuated against the force of the spring assembly 170 parallel to the support axis ST, the steps 186 disengage so that the locking body 150 is released for rotation and is rotated from its unlocking position into its locking position by the torsion spring 158.

When the locking body 150 is rotated again from its locking position to the unlocking position, the actuating bevels 185, 189 slide along each other, whereby the gear body 187 and thus the blocking body 161 can be adjusted from its release position into its blocking position by the spring assembly 170. When the locking body 150 assumes its unlocking position, the spring assembly 170 loads the blocking body 161 into its locking position in such a way that the steps 186 of the two gear bodies 181 and 187 engage with one another and thus the locking body 150 is obstructed or blocked against rotation or displacement from its unlocking position into its locking position.

In the unlocking position of the locking body 150, the drive element 123 is advantageously blocked against rotation about its axis of rotation, namely by an anti-rotation body 191 of an anti-rotation device 190. The anti-rotation body 191 is formed, for example, by the support body 173 of the spring assembly 170. The support body 73 has a passage opening for the shaft element 121 and end-face form-fit contours 192 surrounding this passage opening. These serve to engage with the end-face form-fit contours 193 of a coupling body 194, which is connected to the shaft element 121 in a rotationally fixed manner. The coupling body 194 is designed, for example, as an annular body which has a passage opening penetrated by the shaft element 121, the inner circumference of which has form-fit contours 195 for holding the shaft element 121 in a rotationally fixed manner, for example form-fit contours 195 that fit the rotary synchronization contours 123A in a form-fit manner, in particular that are designed as a hexagon. When the spring assembly 170 loads the blocking body 161 into its blocking position, the support body 173 is simultaneously adjusted in the direction of the drive side 111, whereby the form-fit contours 192, 193 come into engagement with one another and the shaft element 121 is thus positioned in a rotationally fixed manner.

An attachment 110B has the same or similar components as attachment 110, which are usually designated with the same numbers as the components of attachment 110, namely, for example, a shaft element 121B, which has a drive shaft element 123, which in turn is non-rotatably connected to its output element 120A, and bearing sections 124 and 125 for a ball bearing 126 and a slide bearing 127. An attachment housing 113B of the attachment 110B has bearing mounts 116, 117 for the shaft element 121B, on which the bearings 126, 127 are held and mounted.

A locking body 150B is constructed similarly to locking body 150 and has an actuating part 151B, on which a gripping contour 152, e.g. corrugation, is advantageously arranged, and a locking part 150 with an annular projection 154, on which bayonet contours 156 are arranged as locking contours 155.

The locking body 150 is loaded by a torsion spring 158 of a spring assembly 157 in a direction of rotation about its axis of rotation, which is also the support axis ST, from its unlocking position into a locking position, in which the locking contours 155 can or are in engagement with counter-locking contours 235.

For example, a sleeve-like support body 140B is mounted in the attachment housing 113B so as to be displaceable parallel to the support axis ST.

The support body 140B differs from support body 140 in that it is not fixed in place with respect to the attachment housing 113, but is instead movably mounted parallel to the support axis ST.

The support body 140 is loaded in the direction of the drive side 111 by a spring assembly 170B, which comprises, for example, a helical spring 171B. The spring assembly 170B is supported on the attachment housing 113B, on the one hand, and on the support body 140B, on the other hand. On an end face 141 of its circumferential wall 143, the support body 140B has anti-rotation contours 143, for example form-fit projections 144, which are provided for positive engagement with, for example, the anti-rotation contours 233. The spring assembly 170 thus loads the anti-rotation contours 143 in the direction of the anti-rotation position, that is to say, for example, toward the hand-held power tool 200.

In order to hold the locking body 150B in its unlocking position and release the locking body 150B into its locking position, an actuating device 160B is provided, with which the support body 140B forms an essential part by performing the function of a blocking body 161B.

An end face 141 of the support body 140B, namely, has an actuating contour 162 of the blocking body 161B, for example the anti-rotation contours 143. The actuating contour 162 is actuated in a direction of movement from the drive side 111 to the output side 112 when the attachment 110B is attached, for example, to the hand-held power tool 200, whereby the blocking body 161B is moved linearly in the direction of the support axis ST, and the locking body 150B is free of rotation and can be actuated or rotated from its unlocking position in the direction of its locking position by the torsion spring 158.

A gear body 181B is non-rotatably connected to the locking body 150B, for example by means of screws 182B which penetrate the locking part 153, for example a metallic annular body, and are screwed into the gear body 181. The gear body 181 has a planar surface 184 on its end face facing a gear body 187, from which planar surface actuating bevels 185 extend away, so that steps 186 are formed between the planar surface 184 and the areas of the actuating bevels 185 furthest away from the planar surface 184. These interact with steps 186 of the gear body 187, as already explained above, which are formed in that actuating bevels 189 extend away from the planar surface 188, which is opposite planar surface 184.

When the blocking body 161 is moved linearly away from the drive side 111, the steps 186 disengage from one another, so that the locking body 150B is free of rotation and can accordingly be rotated from its unlocking position into its locking position.

Furthermore, an end face of the support body 140 opposite the anti-rotation contours 143, which represents a stop 167B, is supported on a support stop 118B of the attachment housing 113B, so that the anti-rotation contours 143 can no longer recede further away from the drive side 111 and can accordingly firmly engage with the counter-anti-rotation contours respectively opposite therefrom, for example counter-anti-rotation contours 235.

When the locking body 150 is rotated again from its locking position to the unlocking position, the actuating bevels 185, 189 slide along each other, in which the spring assembly 170B can adjust the blocking body 161 from its release position into its blocking position, in which the actuating contours 162 of the blocking body 161B are preadjusted further in the direction of the drive side 111.

The locking body 150, in particular its locking part 153, is preferably held on the attachment housing 113B by a bearing body 177, which engages, for example, with a corresponding bearing groove 179 of the locking body 150B, which is present, for example, between said locking body and the gear body 181B. The bearing body 177 is ring-shaped, for example, and penetrated by the support body 140B. The bearing body 177 is fastened to the attachment housing 113B by means of screws 178 or other similar fastening means.

The support body 140 is mounted on its circumferential wall 142 in a manner secured against rotation with respect to the support axis ST in the attachment housing 113B by means of anti-rotation contours 145.

The present fastening design, which can also be referred to as a quick lock, is of course also suitable for other types of attachments.

An attachment 510 is equipped, for example, with a speed-changing gear, so it can be referred to as a gear attachment. The attachment has the locking body 150B, the support body 140B, and the other explained components of the fastening device 105B. However, the attachment 510 is not passive with regard to the rotational speed between its drive element 123 and its output element 520A, which has a tool mount 120. Rather, a gear 530, for example a planetary gear, is arranged between the drive element 123 and the output element 520A. The gear 530 comprises a sun gear 531, which is arranged, for example, at the longitudinal end of a shaft element 521 remote from the output element 123, on which the drive element 123 is arranged. The sun gear 531 meshes with planetary gears 532 which are arranged on a planetary carrier 533. The planetary carrier 533 is non-rotatably connected to a shaft element 523, on the free section of which the tool mount 120 is arranged, which free section protrudes in front of the attachment 150B on the output side 112. The output element 520A, for example, is rotatably mounted on bearings 527, in particular ball bearings, with respect to an attachment housing 513. The shaft element 521 is rotatably mounted on or with respect to the attachment housing 513 by means of a bearing 526, for example a slide bearing.

An attachment 610 with an attachment housing 613 has, for example, the fastening device 105 of the attachment 110. The attachment 610 forms an angle attachment. The attachment 610 has a shaft element 621 on which a drive element 123 is arranged. An angular gear 630 is provided, which has, for example, bevel gears 631, 632 on the longitudinal end region of the shaft element 621, which end region is opposite the drive element 123. The bevel gear 631 is connected to the shaft element 621 in a rotationally fixed manner, while the bevel gear 632 is connected to an output shaft element 633, on the free section of which a tool mount 120 is arranged, which free section protrudes in front of an attachment housing 613. Axes of rotation DA, DB of the shaft elements 621, 633 are at right angles to one another.

The attachments 110, 110B can be used with guide device 20 or 20A, for example. However, a guide assembly 270 with a guide body 271, which is designed, for example, as a handgrip element 272, can be attached to the hand-held power tool 200 with the aid of the attachment 110, 110B. The guide assembly 270 can be releasably attached to attachment 110 or 110B, but could also form a fixed part of same. It can be seen in the drawing that the neck section 204 of the hand-held power tool 200 is too narrow to attach a mounting bracket 280 of the guide assembly 270 to it. Accordingly, it is only the attachment 110, 110B that enables the guide assembly 270 to be fastened to the hand-held power tool 200.

The mounting bracket 280 comprises a base body 281 from which the handgrip element 272 protrudes. The base body 281 and a tensile body 282 opposite thereto are firmly connected to the longitudinal ends of a clamping ring 291 which delimits a retaining mount 288. The clamping ring 291 comprises, for example, a steel ring, in particular a spring steel ring, a plastic ring, or the like.

The base body 281 and the tensile body 282 are penetrated by a clamping screw 294, the head 295 of which is mounted in a mount 283 of the tensile body 282 so as to be non-rotatable. For example, form-fit contours, in particular hexagonal contours, are provided on the outer circumference of the head 295 and on the inner circumference of the mount 283 for holding the clamping screw 294 in a manner secure against rotation. A nut 296 is screwed onto the clamping screw 294, which nut is mounted on or in the handgrip element 272 in a rotationally fixed manner.

The handgrip element 272 projects in front of the base body 281 at an angle to the axis of rotation D or to the longitudinal center axis of the retaining mount 288. A longitudinal axis LG of the handgrip element 272 extends, for example, at a right angle to the axis of rotation D of the tool mount 120. By rotating the handgrip element 272 about its longitudinal axis LG, which is indicated by arrows in the drawing, the nut 296 can be screwed onto or unscrewed from the clamping screw 294, so that the tensile body 282 and the base body 281 are moved toward or away from one another, in which the cross-section of the retaining mount 288 is narrowed or widened in the sense of clamping the attachment 110, 110B. In the latter case, the attachment 110, 110B can be pulled out of the retaining mount 288, which is designed as a plug-in mount.

The aforementioned fastening devices 105, 105B enable the attachments 110, 110B to be attached quickly and easily to the hand-held power tool 200, so that the attachments 110, 110B with the guide assembly 270 arranged thereon can easily be attached to or detached from the hand-held power tool 200. The guide device 20, 20A can also be attached to or detached from the hand-held power tool 200 just as quickly.

Furthermore, the attachment 110, 110B also enables, so to speak, an extension of the drive train of the hand-held power tool 200 in the direction of its axis of rotation D. For example, a further attachment, for example an angle attachment 450, can be attached to the output element 120A. The angle attachment 450 has, for example, a bayonet ring in the manner of the locking body 150, the locking contours of which can be brought into engagement with the counter-locking contours 135.

The invention claimed is:

1. An attachment for a hand-held power tool, wherein the attachment comprises:
    an attachment housing;
    a drive element on a drive side, wherein the drive element can be coupled to a machine output element of the hand-held power tool in order to drive the attachment and firmly connected to an output element of the attachment or motion-coupled via a gear in order to drive a working tool; and
    a fastening device on the drive side for detachable fastening to the hand-held power tool, wherein the fastening device comprises:
        at least one support surface that is stationary with respect to the attachment housing for support on the hand-held power tool in a direction of a support axis; and
        at least one locking body adjustable between a locking position and an unlocking position and loaded into the locking position by a spring assembly,
    wherein the at least one locking body has at least one locking contour which, in the locking position, is in engagement with a counter-locking contour of the hand-held power tool when the at least one support surface is supported on the hand-held power tool, and, in the unlocking position, is out of engagement with the counter-locking contour in order to remove the attachment from the hand-held power tool, and wherein the at least one locking body is rotatably mounted about the support axis an the adjustment between the locking position and the unlocking position, and wherein the attachment further comprises an actuating device for triggering a movement of the at least one locking body from the unlocking position into the locking position, wherein the actuating device has a blocking body which holds the at least one locking body in a blocking position against the force of the spring assembly in the unlocking position and which can be brought into a release position, by an operator action, in which the blocking body releases the at least one locking body for movement out of the unlocking position in a direction of the locking position.

2. The attachment according to claim 1, wherein a tool mount for the working tool is arranged on the output element, so that the drive motor of the hand-held power tool can drive the working tool via the attachment.

3. The attachment according to claim 1, wherein the locking contour is provided and/or designed for engagement with a counter-locking contour of the hand-held power tool, which is stationary with respect to a machine housing of the hand-held power tool.

4. The attachment according to claim 1, wherein the at least one locking body and the drive element are rotatably mounted independently of one another and/or rotationally decoupled from each other with respect to the attachment housing or on the attachment housing.

5. The attachment according to claim 1, wherein at least one locking contour is/or comprises a bayonet contour and/or has an arc shape and/or extends annularly around the support axis and/or comprises a locking cam.

6. The attachment according to claim 1, wherein the at least one locking contour has at least one clamping contour, for clamping the attachment to the hand-held power tool.

7. The attachment according to claim 1, wherein the at least one locking body is designed as an annular body extending around the support axis in a partially ring-shaped or ring-shaped manner.

8. The attachment according to claim 1, wherein the at least one locking contour comprises at least two locking contours arranged at an angular distance on the at least one locking body.

9. The attachment according to claim 1, wherein the at least one locking body cannot be actuated from the locking position in a direction of the unlocking position when the attachment is arranged on the hand-held power tool and/or wherein, on a side of the locking body facing the hand-held power tool, there is no actuating surface or actuating bevel arranged with the aid of which a contour of the hand-held power tool can actuate the at least one locking body from the locking position in the direction of the unlocking position.

10. The attachment according to claim 1, wherein the at least one locking body has at least one gripping contour which can be grasped by an operator.

11. The attachment according to claim 1, wherein the spring assembly comprises a torsion spring through which the support axis passes and which is supported, on the one hand, on the attachment housing and, on the other hand, on the at least one locking body.

12. The attachment according to claim 1, wherein the drive element is arranged in an interior space of the spring assembly and/or of the at least one locking body.

13. The attachment according to claim 1, wherein the blocking body is longitudinally displaceable, and/or is rotatably mounted on the attachment housing or with respect to the attachment housing.

14. The attachment according to claim 1, wherein the blocking body is loaded in a direction of the blocking position by the spring assembly.

15. The attachment according to claim 1, the blocking body has an actuating contour which can be actuated by the hand-held power tool to actuate the blocking body from the blocking position into the release position.

16. The attachment according to claim 1, wherein the at least one anti-rotation contour is arranged on the blocking body and/or is designed to actuate the blocking body from the blocking position into the release position.

17. The attachment according to claim 1, wherein an actuating gear is arranged between the at least one locking body and the blocking body, by means of which actuating gear the at least one locking body releases or actuates the blocking body for an adjustment from the release position of the blocking body into the blocking position of the blocking body when the at least one locking body moved from the locking position of the at least one locking body to the unlocking position of the at least one locking body.

18. The attachment according to claim 17, wherein the actuating gear is a bevel gear and/or deflects or releases a rotary movement of the at least one locking body about the support axis into a linear movement of the blocking body parallel to the support axis and/or has inclined surfaces for engagement with one another.

19. The attachment according to claim 1, wherein no torque-converting or speed-changing component is arranged between the drive element and the output element or wherein the gear is a speed-changing gear, and/or an angular gear is arranged and/or wherein the axes of rotation of the drive element and of the output element are angled to one another or have parallel spacing apart from one another.

20. The attachment according to claim 1, wherein on an output side of the attachment, wherein the output side has the output element, fastening means are arranged which are compatible with the fastening device and comprise a support body for supporting the support surface of the fastening device and a counter-locking contour for engaging the at least one locking contour of the fastening device.

21. The attachment according to claim 1, further comprising at least one anti-rotation contour for supporting the attachment on the hand-held power tool in a rotationally fixed manner with respect to the support axis, wherein the at least one anti-rotation contour is in engagement with a counter-anti-rotation contour of the hand-held power tool when the attachment is mounted on the hand-held power tool.

22. The attachment according to claim 21, wherein the at least one anti-rotation contour is arranged in an interior space of the at least one locking body.

23. The attachment according to claim 21, wherein the at least one anti-rotation contour is stationary with respect to the attachment housing.

24. The attachment according to claim 21, wherein the at least one anti-rotation contour is displaceably mounted in the direction of the support axis.

25. The attachment according to claim 24, further comprising at least one support stop for the at least one anti-rotation contour, with which support stop a body of the attachment, which body has the anti-rotation contour, makes contact when the at least one anti-rotation contour engages with the counter-anti-rotation contour of the hand-held power tool.

26. The attachment according to claim 24, wherein the at least one anti-rotation contour is loaded by a spring assembly in a direction of an engagement position provided for engaging with the counter-anti-rotation contour of the hand-held power tool.

27. The attachment according to claim 21, wherein the at least one anti-rotation contour has form-fit projections for engagement with form-fit mounts of the hand-held power tool and/or wherein the at least one anti-rotation contour extends in an arc-shaped or star-shaped manner around the support axis.

28. The attachment according to claim 21, wherein the at least one anti-rotation contour is arranged on a sleeve body or sleeve-like support body.

29. An attachment An attachment for a hand-held power tool, wherein the attachment comprises:
- an attachment housing;
- a drive element on a drive side, wherein the drive element can be coupled to a machine output element of the hand-held power tool in order to drive the attachment and firmly connected to an output element of the attachment or motion-coupled via a gear in order to drive a working tool; and
- a fastening device on the drive side for detachable fastening to the hand-held power tool, wherein the fastening device comprises:
  - at least one support surface that is stationary with respect to the attachment housing for support on the hand-held power tool in a direction of a support axis; and
  - at least one locking body adjustable between a locking position and an unlocking position and loaded into the locking position by a spring assembly,
- wherein the at least one locking body has at least one locking contour which, in the locking position, is in engagement with a counter-locking contour of the hand-held power tool when the at least one support surface is supported on the hand-held power tool, and, in the unlocking position, is out of engagement with the counter-locking contour in order to remove the attachment from the hand-held power tool, and wherein the at least one locking body is rotatably mounted about the support axis an the adjustment between the locking position and the unlocking position, and
- wherein the attachment further comprises an anti-rotation device for the drive element, wherein the anti-rotation device is motion-coupled to the at least one locking body and which assumes an anti-rotation position in the unlocking position of the at least one locking body and positions the drive element in a rotationally fixed manner and assumes a rotation-release position in the locking position of the at least one locking body and releases the drive element to enable the drive element to rotate.

30. The attachment according to claim 29, further comprising an actuating device for triggering a movement of the at least one locking body from the unlocking position into the locking position, wherein the actuating device has a blocking body which holds the at least one locking body in a blocking position against the force of the spring assembly in the unlocking position and which can be brought into a release position, by an operator action, in which the blocking body releases the at least one locking body for movement out of the unlocking position in a direction of the locking position.

* * * * *